United States Patent
Orio et al.

(10) Patent No.: US 9,390,471 B1
(45) Date of Patent: Jul. 12, 2016

(54) DEVICE AND METHOD FOR IMAGE SCALING

(71) Applicant: Synaptics Display Devices GK, Tokyo (JP)

(72) Inventors: Masao Orio, Tokyo (JP); Hirobumi Furihata, Tokyo (JP); Takashi Nose, Tokyo (JP)

(73) Assignee: Synaptics Display Devices GK, Tokyo (JP)

( * ) Notice: Subject to any disclaimer, the term of this patent is extended or adjusted under 35 U.S.C. 154(b) by 0 days.

(21) Appl. No.: 14/830,249

(22) Filed: Aug. 19, 2015

(30) Foreign Application Priority Data

Feb. 5, 2015 (JP) .................. 2015-021417

(51) Int. Cl.
*G06K 9/32* (2006.01)
*G06T 3/40* (2006.01)
*G06T 5/50* (2006.01)

(52) U.S. Cl.
CPC .............. *G06T 3/4007* (2013.01); *G06T 5/50* (2013.01); *G06T 2207/20224* (2013.01)

(58) Field of Classification Search
CPC ....... G06T 3/4007; G06T 3/403; G06T 5/001; H04N 9/045; H04N 7/012
See application file for complete search history.

(56) References Cited

U.S. PATENT DOCUMENTS

2011/0170803 A1  7/2011 Yokoi

FOREIGN PATENT DOCUMENTS

| JP | S62282377 | A | 12/1987 |
| JP | H02176873 | A | 7/1990 |
| JP | H02234579 | A | 9/1990 |
| JP | H04156690 | A | 5/1992 |
| JP | H0818769 | A | 1/1996 |
| JP | H08315129 | A | 11/1996 |
| WO | 2012114574 | A1 | 8/2012 |

*Primary Examiner* — Duy M Dang
(74) *Attorney, Agent, or Firm* — Patterson + Sheridan, LLP

(57) ABSTRACT

An image processing circuit includes a scaling processing section having interpolation coefficient inputs, an interpolation coefficient rearrangement section and an interpolation coefficient feeding section. The interpolation coefficient feeding section feeds first interpolation coefficients to the interpolation coefficient rearrangement section. The interpolation coefficient rearrangement section is configured to feed interpolation coefficients selected from the first interpolation coefficients and second interpolation coefficients obtained by subtracting the first interpolation coefficients from a predetermined value, respectively, to the respective interpolation coefficient inputs of the scaling processing section in response to coordinates of a target pixel of the output image. The scaling processing section is configured to generate pixel data of the target pixel of the output image by performing interpolation on the pixel data of pixels of the input image, using the interpolation coefficients fed to the interpolation coefficient inputs from the interpolation coefficient rearrangement section.

20 Claims, 24 Drawing Sheets

Fig. 7A

| (y/2)%2 | (x/2)%2 | a | b | c | d |
|---|---|---|---|---|---|
| 0 | 0 | A | B | C | D |
| 0 | 1 | B | A | D | C |
| 1 | 0 | C | D | A | B |
| 1 | 1 | D | C | B | A |

Fig. 7B

| y%2 | x%2 | q1 | q2 | q3 | q4 | q5 | q6 |
|---|---|---|---|---|---|---|---|
| 0 | 0 | s | 1-s | s | 1-s | s | 1-s |
| 0 | 1 | t | 1-t | t | 1-t | s | 1-s |
| 1 | 0 | s | 1-s | s | 1-s | t | 1-t |
| 1 | 1 | t | 1-t | t | 1-t | t | 1-t |

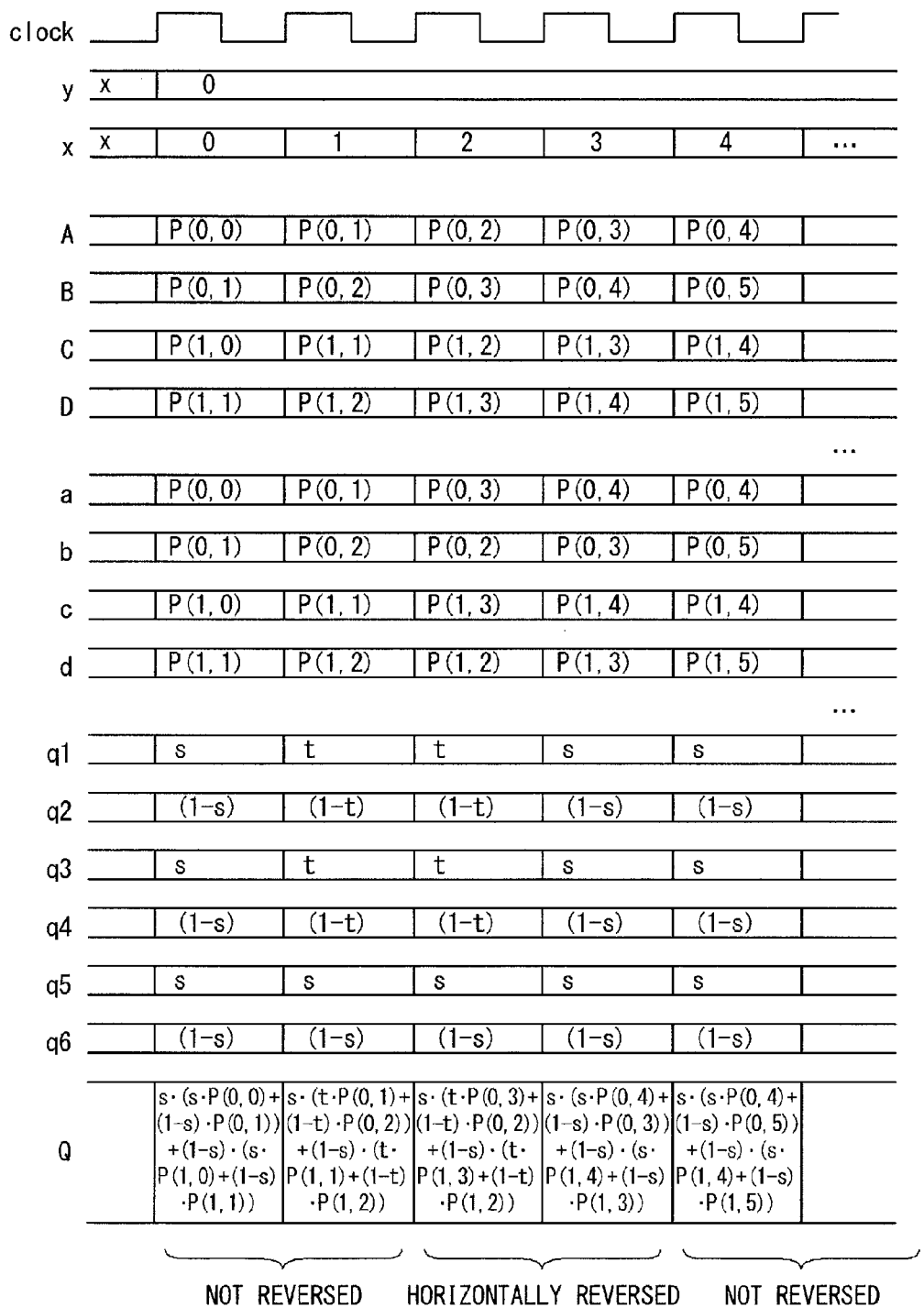

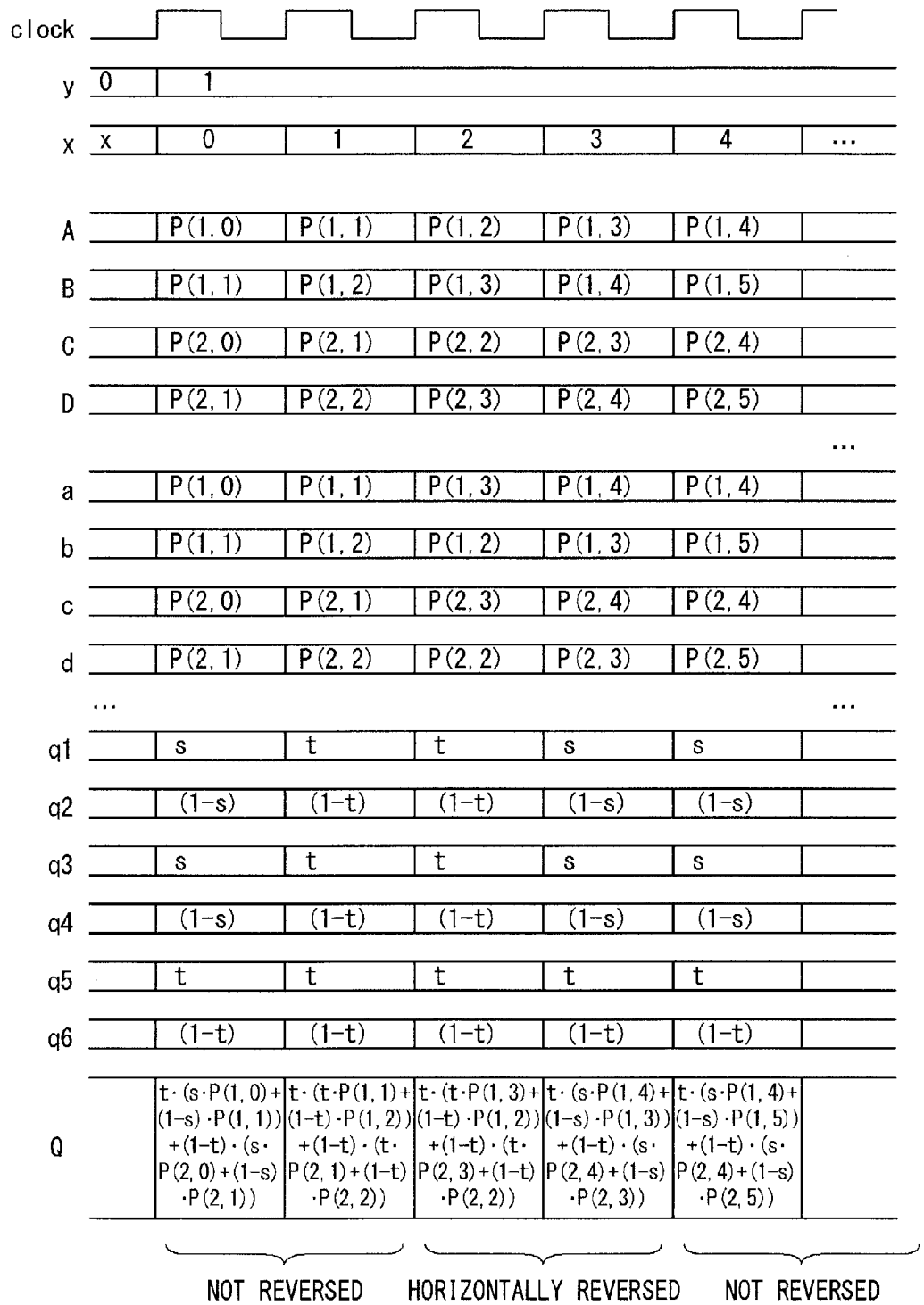

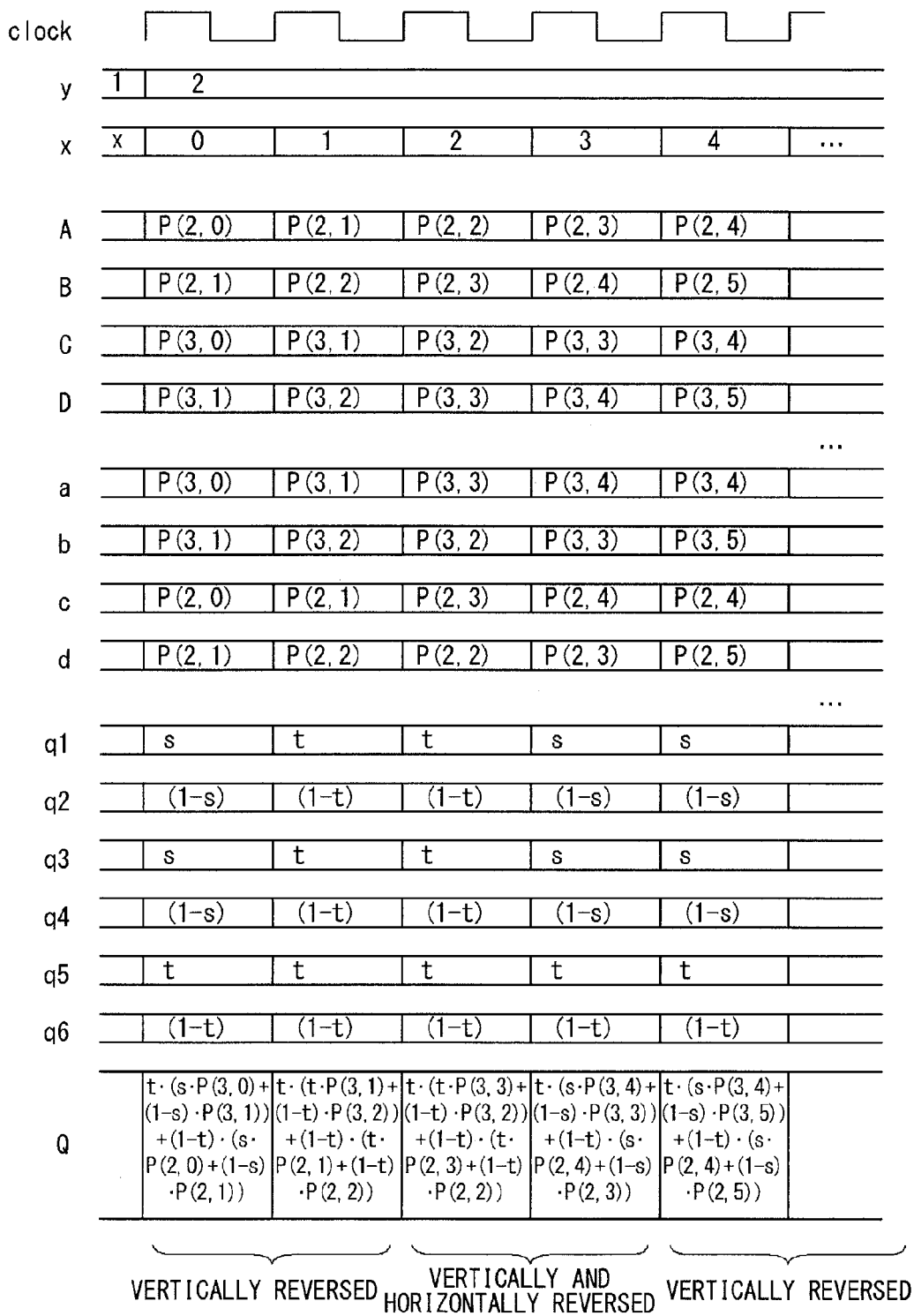

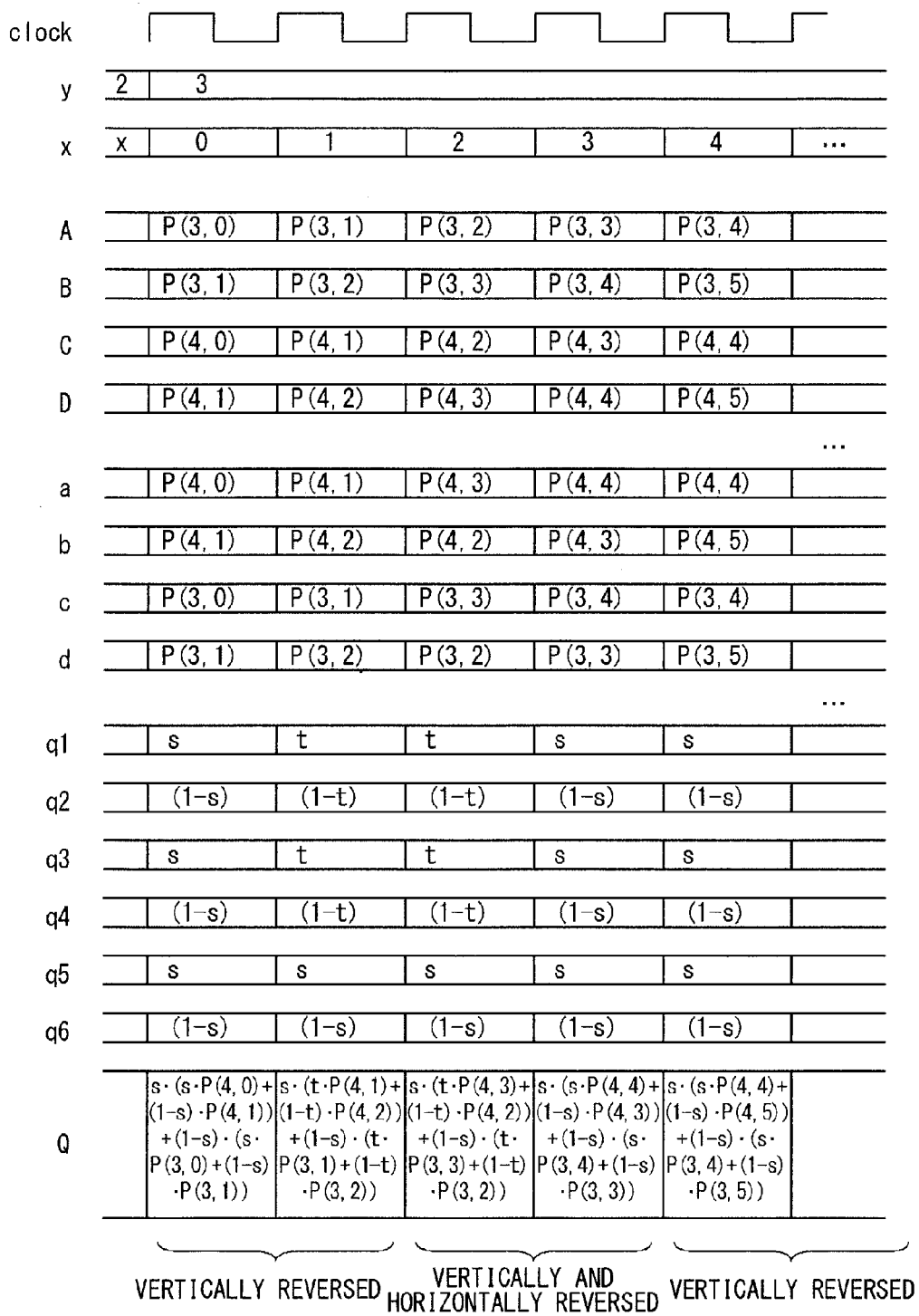

▨ : PIXELS P OF INPUT IMAGE
▦ : PIXELS Q OF OUTPUT IMAGE

| y%3 | q5 | q6 |
|---|---|---|
| 0 | s | 1-s |
| 1 | t | 1-t |
| 2 | 1-s | s |

Fig. 14B

| | | |
|---|---|---|
| clock | ⎍⎍⎍ | |
| y | 0 | |
| a1 | P(0,0) | P(0,2) |
| b1 | P(0,1) | P(0,3) |
| c1 | P(1,0) | P(1,2) |
| d1 | P(1,1) | P(1,3) |
| a2 | P(0,1) | P(0,3) |
| b2 | P(0,2) | P(0,4) |
| c2 | P(1,1) | P(1,3) |
| d2 | P(1,2) | P(1,4) |
| a3 | P(0,3) | P(0,5) |
| b3 | P(0,2) | P(0,4) |
| c3 | P(1,3) | P(1,5) |
| d3 | P(1,2) | P(1,4) |
| q5 | s | s |
| q6 | (1−s) | (1−s) |
| Q1 | $s \cdot (s \cdot P(0,0) + (1-s) \cdot P(0,1)) + (1-s) \cdot (s \cdot P(1,0) + (1-s) \cdot P(1,1))$ | $s \cdot (s \cdot P(0,2) + (1-s) \cdot P(0,3)) + (1-s) \cdot (s \cdot P(1,2) + (1-s) \cdot P(1,3))$ |
| Q2 | $s \cdot (t \cdot P(0,1) + (1-t) \cdot P(0,2)) + (1-s) \cdot (t \cdot P(1,1) + (1-t) \cdot P(1,2))$ | $s \cdot (t \cdot P(0,3) + (1-t) \cdot P(0,4)) + (1-s) \cdot (t \cdot P(1,3) + (1-t) \cdot P(1,4))$ |
| Q3 | $s \cdot (s \cdot P(0,3) + (1-s) \cdot P(0,2)) + (1-s) \cdot (s \cdot P(1,3) + (1-s) \cdot P(1,2))$ | $s \cdot (s \cdot P(0,5) + (1-s) \cdot P(0,4)) + (1-s) \cdot (s \cdot P(1,5) + (1-s) \cdot P(1,4))$ |

Fig. 15B

| | | | |
|---|---|---|---|
| clock | ⎍⎍⎍ | | |
| y | – | 1 | |
| a1 | | P(1,0) | P(1,2) |
| b1 | | P(1,1) | P(1,3) |
| c1 | | P(2,0) | P(2,2) |
| d1 | | P(2,1) | P(2,3) |
| a2 | | P(1,1) | P(1,3) |
| b2 | | P(1,2) | P(1,4) |
| c2 | | P(2,1) | P(2,3) |
| d2 | | P(2,2) | P(2,4) |
| a3 | | P(1,3) | P(1,5) |
| b3 | | P(1,2) | P(1,4) |
| c3 | | P(2,3) | P(2,5) |
| d3 | | P(2,2) | P(2,4) |
| q5 | | t | t |
| q6 | | (1−t) | (1−t) |
| Q1 | | t·(s·P(1,0)+(1−s)·P(1,1))+(1−t)·(s·P(2,0)+(1−s)·P(2,1)) | t·(s·P(1,2)+(1−s)·P(1,3))+(1−t)·(s·P(2,2)+(1−s)·P(2,3)) |
| Q2 | | t·(t·P(1,1)+(1−t)·P(1,2))+(1−t)·(t·P(2,1)+(1−t)·P(2,2)) | t·(t·P(1,3)+(1−t)·P(1,4))+(1−t)·(t·P(2,3)+(1−t)·P(2,4)) |
| Q3 | | t·(s·P(1,3)+(1−s)·P(1,2))+(1−t)·(s·P(2,3)+(1−s)·P(2,2)) | t·(s·P(1,5)+(1−s)·P(1,4))+(1−t)·(s·P(2,5)+(1−s)·P(2,4)) |

Fig. 16B

| | clock | 1 | 2 |
|---|---|---|---|
| y | | 1 | 2 |
| a1 | | P(2,0) | P(2,2) |
| b1 | | P(2,1) | P(2,3) |
| c1 | | P(3,0) | P(3,2) |
| d1 | | P(3,1) | P(3,3) |
| a2 | | P(2,1) | P(2,3) |
| b2 | | P(2,2) | P(2,4) |
| c2 | | P(3,1) | P(3,3) |
| d2 | | P(3,2) | P(3,4) |
| a3 | | P(2,3) | P(2,5) |
| b3 | | P(2,2) | P(2,4) |
| c3 | | P(3,3) | P(3,5) |
| d3 | | P(3,2) | P(3,4) |
| q5 | | (1−s) | (1−s) |
| q6 | | s | s |
| Q1 | | (1−s)·(s·P(2,0)+(1−s)·P(2,1))+s·(s·P(3,0)+(1−s)·P(3,1)) | (1−s)·(s·P(2,2)+(1−s)·P(2,3))+s·(s·P(3,2)+(1−s)·P(3,3)) |
| Q2 | | (1−s)·(t·P(2,1)+(1−t)·P(2,2))+s·(t·P(3,1)+(1−t)·P(3,2)) | (1−s)·(t·P(2,3)+(1−t)·P(2,4))+s·(t·P(3,3)+(1−t)·P(3,4)) |
| Q3 | | (1−s)·(s·P(2,3)+(1−s)·P(2,2))+s·(s·P(3,3)+(1−s)·P(3,2)) | (1−s)·(s·P(2,5)+(1−s)·P(2,4))+s·(s·P(3,5)+(1−s)·P(3,4)) |

DEVICE AND METHOD FOR IMAGE SCALING

CROSS REFERENCE

This application claims priority of Japanese Patent Application No. Japanese Patent Application No. 2015-021417, filed on Feb. 5, 2015, the disclosure which is incorporated herein by reference.

TECHNICAL FIELD

The present disclosure relates to an image processing circuit, a display panel driver, a display device and an image processing method, more particularly, to a device and method for image scaling, which can be used in an image processing circuit, a display panel driver and a display device.

BACKGROUND ART

A display panel driver driving a display panel (e.g. a liquid crystal display panel) often has the function of performing image scaling to enlarge an image. Such function may be used for generating pixel data matching the display panel resolution from input image data externally fed to the display panel driver, when the input image data do not match the display panel resolution.

The bilinear method is one known method for image scaling. In the bilinear method, pixel data of an output image (an enlarged or reduced image) are calculated through linear interpolation of pixel data of input image. Image scaling through a bilinear method typically involves determining the position of each pixel of the output image in accordance with the enlargement/reduction factor and calculating pixel data of each pixel (more typically, including data indicative of the grayscale levels of the red (R), green (G) and blue (B) colors) through linear interpolation of pixel data of four pixels of the input image closest to each pixel of the output image. The weights given to the four closest pixels of the input image in the linear interpolation are determined on the basis of the position of each pixel of the output image.

In an integrated circuit (IC) such as a display panel driver, image scaling is often achieved by a hardware circuit. The configuration in which image scaling is achieved by a hardware circuit is superior in terms of the processing speed, and suitable especially for a system which uses real-time image processing, such as a display panel driver.

One issue of hardware-based image scaling is the feeding of interpolation coefficients. When performing image scaling with a scaling factor of M/N (that is, generating image data of M×M pixels of an output image from image data of N×N pixels of an input image), it is advantageous to determine the interpolation coefficients for each of M×M pixels of the output image, where M and N are positive integers selected so that M/N is an irreducible fraction. In other words, image scaling with a scaling factor of M/N uses feeding M×M sets of interpolation coefficients to an image scaling circuit. This undesirably increases hardware resources necessary for feeding interpolation coefficients. When an ROM (read only memory) is used to store necessary interpolation coefficients, for example, the circuit size of the ROM is undesirably increased.

Accordingly, there is a technological need for reducing hardware resources used for feeding interpolation coefficients.

It should be noted that image scaling is disclosed in patent documents listed below:

Japanese Patent Application Publication No. H02-176873 A discloses a technique in which interpolation functions and enlargement factors are stored in an ROM.

Japanese Patent Application Publication No. H02-234579 A discloses a technique which involves calculating pixel data of a midpoint pixel positioned at the midpoint between adjacent two pixels from pixel data of the adjacent two pixels and pixels near the two pixels, and calculating pixel data of a new pixel positioned at a desired position between the adjacent two pixels through interpolation using the pixel data of the midpoint pixel.

International Publication No. WO 2012/114574 A1 discloses a technique in which pixel data of each pixel of an enlarged image are calculated through interpolation of pixel data of multiple pixels of a low-resolution image. In the technique disclosed in this international publication, interpolation coefficients given to pixel data of a pixel highly-correlated to a target pixel are increased to achieve appropriate interpolation independent of the shape of an edge included in the image.

Japanese Patent Application Publication No. 2011-146888 A discloses a technique which involves calculating a pixel change rate from pixel data of three neighbor pixels including two adjacent pixels in an original image for a target pixel of an enlarged image, and performing interpolation using the calculated pixel change rate.

Japanese Patent Application Publication No. H08-315129 A discloses a technique which achieves image enlargement through quadrature transform into the frequency domain.

Japanese Patent Application Publication No. H08-18769 A discloses image enlargement processing for generating N×N pixels around each pixel of an original image. In the technique disclosed in this patent document, pixel data of pixels positioned on the left, right, top and bottom of each pixel of the original image are determined as equal to pixel data of each pixel of the original image, and image data of pixels positioned obliquely to each pixel of the original image are determined as the average of pixel data of pixels around each pixel of the original image.

Japanese Patent Application Publication No. H04-156690 A discloses image enlargement processing through affine transformation.

Japanese Patent Application Publication No. S62-282377 A discloses a technique which uses a shift register as a line buffer and calculates interpolation coefficients through dividing an address by an enlargement factor.

SUMMARY

In one example, an image processing circuit for generating an output image by performing image scaling on an input image is provided. The circuit may include a scaling processing section having a plurality of interpolation coefficient inputs, an interpolation coefficient rearrangement section, and an interpolation coefficient feeding section feeding a plurality of first interpolation coefficients to the interpolation coefficient rearrangement section. The interpolation coefficient rearrangement section is configured to feed interpolation coefficients selected from the plurality of first interpolation coefficients and a plurality of second interpolation coefficients obtained by subtracting the first interpolation coefficients from a predetermined value, respectively, to the respective interpolation coefficient inputs of the scaling processing section in response to coordinates of a target pixel of the output image. The scaling processing section is configured to generate pixel data of the target pixel of the output image by performing interpolation on the pixel data of pixels of the input image, using the interpolation coefficients fed to the interpolation coefficient inputs from the interpolation coefficient rearrangement section.

In another example, a display panel driver for driving a display panel is provided. The display panel driver may include a scaler circuit performing image scaling on pixel data of pixels of an input image to generate pixel data of pixels of an output image, and a drive section driving the display panel in response to the pixel data of the pixels of the output image received from the scaler circuit. The scaler circuit may include a scaling processing section having a plurality of interpolation coefficient inputs, an interpolation coefficient rearrangement section, and an interpolation coefficient feeding section feeding a plurality of first interpolation coefficients to the interpolation coefficient rearrangement section. The interpolation coefficient rearrangement section is configured to feed interpolation coefficients selected from the plurality of first interpolation coefficients and a plurality of second interpolation coefficients obtained by subtracting the first interpolation coefficients from a predetermined value, respectively, to the respective interpolation coefficient inputs of the scaling processing section in response to coordinates of a target pixel of the output image. The scaling processing section is configured to generate pixel data of the target pixel of the output image by performing interpolation on the pixel data of pixels of the input image, using the interpolation coefficients fed to the interpolation coefficient inputs from the interpolation coefficient rearrangement section.

In another example, a display device is provided that includes a display panel and a display panel driver. The display panel driver includes a scaler circuit performing image scaling on pixel data of pixels of an input image to generate pixel data of pixels of an output image, and a drive section driving the display panel in response to the pixel data of the pixels of the output image received from the scaler circuit. The scaler circuit includes a scaling processing section having a plurality of interpolation coefficient inputs, an interpolation coefficient rearrangement section, and an interpolation coefficient feeding section feeding a plurality of first interpolation coefficients to the interpolation coefficient rearrangement section. The interpolation coefficient rearrangement section is configured to feed interpolation coefficients selected from the plurality of first interpolation coefficients and a plurality of second interpolation coefficients obtained by subtracting the first interpolation coefficients from a predetermined value, respectively, to the respective interpolation coefficient inputs of the scaling processing section in response to coordinates of a target pixel of the output image. The scaling processing section is configured to generate pixel data of the target pixel of the output image by performing interpolation on the pixel data of pixels of the input image, using the interpolation coefficients fed to the interpolation coefficient inputs from the interpolation coefficient rearrangement section.

In another example, an image processing method is provide for generating an output image by performing image scaling on an input image with a scaling processing section having a plurality of interpolation coefficient inputs. The method may include feeding a plurality of first interpolation coefficients to an interpolation coefficient rearrangement section; by the interpolation coefficient rearrangement section, feeding interpolation coefficients selected from the plurality of first interpolation coefficients and a plurality of second interpolation coefficients obtained by subtracting the first interpolation coefficients from a predetermined value, respectively, to the respective interpolation coefficient inputs of the scaling processing section in response to coordinates of a target pixel of the output image; and by the scaling processing section, generating pixel data of the target pixel of the output image by performing interpolation on the pixel data of pixels of the input image, using the interpolation coefficients fed to the interpolation coefficient inputs from the interpolation coefficient rearrangement section.

BRIEF DESCRIPTION OF THE DRAWINGS

The above and other advantages and features of the present disclosure will be more apparent from the following description taken in conjunction with the accompanied drawings, in which:

FIG. 7A is a truth table illustrating an exemplary operation of a pixel data rearrangement circuit in the present embodiment;

FIG. 7B is a truth table illustrating an exemplary operation of an interpolation coefficient rearrangement circuit in the present embodiment;

FIG. 8A is a timing chart illustrating the operation of the image processing circuit for y=0 in the present embodiment;

FIG. 8B is a timing chart illustrating the operation of the image processing circuit for y=1 in the present embodiment;

FIG. 8C is a timing chart illustrating the operation of the image processing circuit for y=2 in the present embodiment;

FIG. 8D is a timing chart illustrating the operation of the image processing circuit for y=3 in the present embodiment;

FIGS. 14A and 14B are timing charts illustrating the operation of the image processing circuit illustrated in FIG. 11 for y=0;

FIGS. 15A and 15B are timing charts illustrating the operation of the image processing circuit illustrated in FIG. 11 for y=1;

FIGS. 16A and 16B are timing charts illustrating the operation of the image processing circuit illustrated in FIG. 11 for y=2;

DETAILED DESCRIPTION

Introduction

Figure 1:
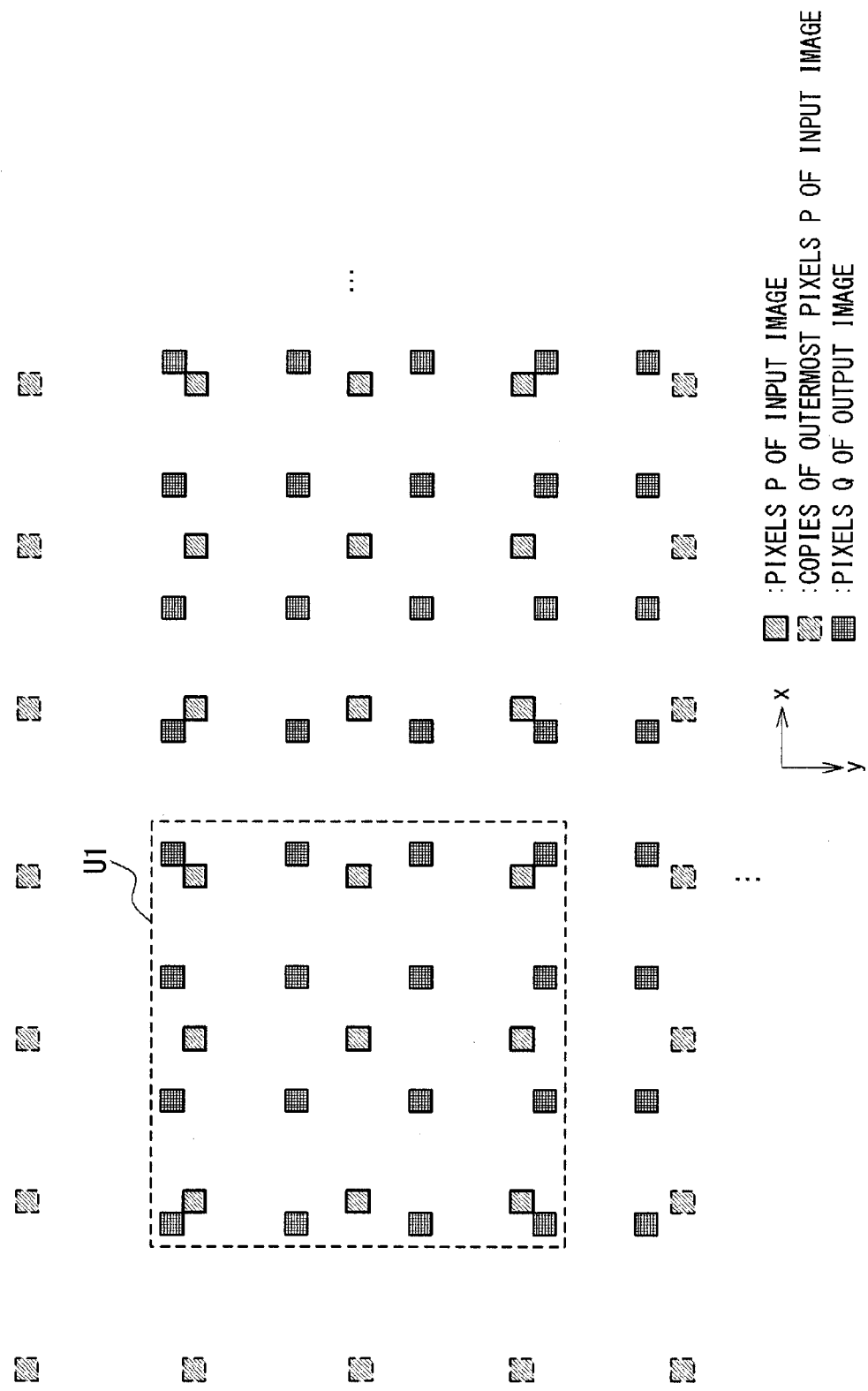
FIG. 1 is a conceptual diagram illustrating an example of bilinear image scaling.

Therefore, an objective of the present disclosure is to reduce hardware resources used for feeding interpolation coefficients to a circuit which performs image scaling.

Other objectives and new features of the present disclosure would be understood by a person skilled in the art from the following disclosure.

In an aspect of the present disclosure, an image processing circuit for generating an output image by performing image scaling on an input image is provided. The image processing circuit includes a scaling processing section having a plurality of interpolation coefficient inputs, an interpolation coefficient rearrangement section and an interpolation coefficient feeding section. The interpolation coefficient feeding section feeds a plurality of first interpolation coefficients to the interpolation coefficient rearrangement section. The interpolation coefficient rearrangement section is configured to feed interpolation coefficients selected from the plurality of first interpolation coefficients and a plurality of second interpolation coefficients obtained by subtracting the first interpolation coefficients from a predetermined value, respectively, to the respective interpolation coefficient inputs of the scaling processing section in response to coordinates of a target pixel of the output image. The scaling processing section is configured to generate pixel data of the target pixel of the output image by performing interpolation on the pixel data of pixels of the input image, using the interpolation coefficients fed to the interpolation coefficient inputs from the interpolation coefficient rearrangement section.

In another aspect of the present disclosure, a display panel driver for driving a display panel is provided. The display panel driver includes: a scaler circuit performing image scaling on pixel data of pixels of an input image to generate pixel data of pixels of an output image; and a drive section driving the display panel in response to the pixel data of the pixels of the output image received from the scaler circuit. The scaler circuit includes a scaling processing section having a plurality of interpolation coefficient inputs, an interpolation coefficient rearrangement section and an interpolation coefficient feeding section. The interpolation coefficient feeding section feeds a plurality of first interpolation coefficients to the interpolation coefficient rearrangement section. The interpolation coefficient rearrangement section is configured to feed interpolation coefficients selected from the plurality of first interpolation coefficients and a plurality of second interpolation coefficients obtained by subtracting the first interpolation coefficients from a predetermined value, respectively, to the respective interpolation coefficient inputs of the scaling processing section in response to coordinates of a target pixel of the output image. The scaling processing section is configured to generate pixel data of the target pixel of the output image by performing interpolation on the pixel data of pixels of the input image, using the interpolation coefficients fed to the interpolation coefficient inputs from the interpolation coefficient rearrangement section.

In still another aspect of the present disclosure, a display device includes a display panel and a display panel driver. The display panel driver includes: a scaler circuit performing image scaling on pixel data of pixels of an input image to generate pixel data of pixels of an output image; and a drive section driving the display panel in response to the pixel data of the pixels of the output image received from the scaler circuit. The scaler circuit includes a scaling processing section having a plurality of interpolation coefficient inputs, an interpolation coefficient rearrangement section and an interpolation coefficient feeding section. The interpolation coefficient feeding section feeds a plurality of first interpolation coefficients to the interpolation coefficient rearrangement section. The interpolation coefficient rearrangement section is configured to feed interpolation coefficients selected from the plurality of first interpolation coefficients and a plurality of second interpolation coefficients obtained by subtracting the first interpolation coefficients from a predetermined value, respectively, to the respective interpolation coefficient inputs of the scaling processing section in response to coordinates of a target pixel of the output image. The scaling processing section is configured to generate pixel data of the target pixel of the output image by performing interpolation on the pixel data of pixels of the input image, using the interpolation coefficients fed to the interpolation coefficient inputs from the interpolation coefficient rearrangement section.

The present disclosure effectively reduces hardware resources used for feeding interpolation coefficients to a circuit which performs image scaling.

The present disclosure will be now described herein with reference to illustrative embodiments. Those skilled in the art would recognize that many alternative embodiments can be accomplished using the teachings of the present disclosure and that the disclosure is not limited to the embodiments illustrated for explanatory purposed. It will be appreciated that for simplicity and clarity of illustration, elements in the Figures have not necessary drawn to scale. For example, the dimensions of some of the elements are exaggerated relative to other elements.

For a better understanding of the present disclosure, a description is first given of an overview of bilinear image scaling.

FIG. 1 is a conceptual diagram illustrating an example of bilinear image scaling. Illustrated in FIG. 1 is image enlargement with an enlargement factor of 4/3, that is, image scaling in which image data of 4×4 pixels Q of an output image are generated from image data of 3×3 pixels P of an input image.

In bilinear image scaling, the position of each pixel Q of the output image (enlarged or reduced image) are determined in accordance with the enlargement factor (or reduction factor) and pixel data of each pixel Q of the output image (most typically, data indicative of the red (R), green (G) and blue (B) colors) are calculated through linear interpolation of pixel data of four pixels of the input image closest to each pixel Q. In image enlargement processing, in which some of the pixels of the output image are positioned outward from the outermost pixels P of the input image, pixel data of pixels Q of the output image which are positioned outward from the outermost pixels P of the input image are determined through virtually generating copy pixels which are copies of the outermost pixels P of the input image and have the same pixel data and performing linear interpolation on the pixel data of the outermost pixels P and the copy pixels.

Figure 2:
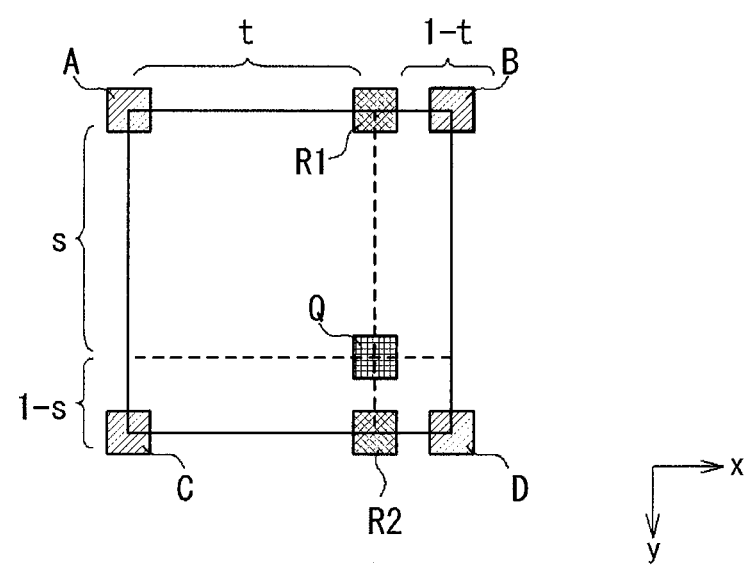
FIG. 2 is a diagram illustrating details of calculation of pixel data of a target pixel Q of an output image through a bilinear method.

FIG. 2 is a diagram illustrating details of calculation of pixel data of a target pixel Q of an output image through a bilinear method. The pixel data of the target pixel Q are calculated from pixel data of four pixels A, B, C and D of the input image, which are closest to the target pixel Q. More specifically, pixel data of pixel R1 are calculated by performing linear interpolation of the pixel data of pixels A and B in the horizontal direction and pixel data of pixel R2 are calculated by performing linear interpolation of the pixel data of pixels C and D in the horizontal direction, where pixel R1 is a virtual pixel positioned at the same horizontal position (position in the x-axis direction) as the target pixel Q and at the same vertical position (position in the y-axis direction) as pixels A and B, and pixel R2 is a virtual pixel positioned at the same horizontal position (position in the x-axis direction) as the target pixel Q and at the same vertical position (position in the y-axis direction) as pixels C and D. The pixel data of the target pixel Q are calculated through performing linear interpolation of the pixel data of pixels R1 and R2 in the vertical direction.

Four interpolation coefficients t, 1-t, s and 1-s are used to calculate the pixel data of the target pixel Q. More specifically, the pixel data of pixels R1 and R2, which are obtained through the interpolation in the horizontal direction, and the pixel data of the target pixel Q can be represented as follows:

$$R1 = t \cdot A + (1-t) \cdot B, \quad (1a)$$

$$R2 = t \cdot C + (1-t) \cdot D, \text{ and} \quad (1b)$$

$$Q = s \cdot R1 + (1-s) \cdot R2. \quad (1c)$$

In the example illustrated in FIG. 2, t and 1-t are interpolation coefficients used for the interpolation in the horizontal direction and s and 1-s are interpolation coefficients used for the interpolation in the vertical direction.

It should be noted that although FIG. 2 illustrates the calculation procedure in which the linear interpolation in the vertical direction follows the linear interpolation in the horizontal direction, the order may be reversed. In an actual implementation, a calculation in which linear interpolations in the horizontal and vertical directions are performed at the same time may be performed. When pixel data are described in a RGB format, the image scaling processing of the pixel data are individually performed for each color.

Referring back to FIG. 1, a unit process of image scaling with a scaling factor of M/N involves generating pixel data of M×M pixels Q of an output image, where M and N are positive integers selected so that M/N is an irreducible fraction. In FIG. 1, which illustrates image scaling with a scaling factor of 4/3, for example, 4×4 pixels Q of the output image in region U1 are pixels Q for which pixel data are processed in a certain unit process. In a bilinear method, pixel data of pixels P of the input image outwardly adjacent to M×M pixels Q of the output image are used to perform interpolation and therefore generation of pixel data of M×M pixels Q of the output image uses pixel data of (N+2)×(N+2) pixels P of the input image.

Figure 3:
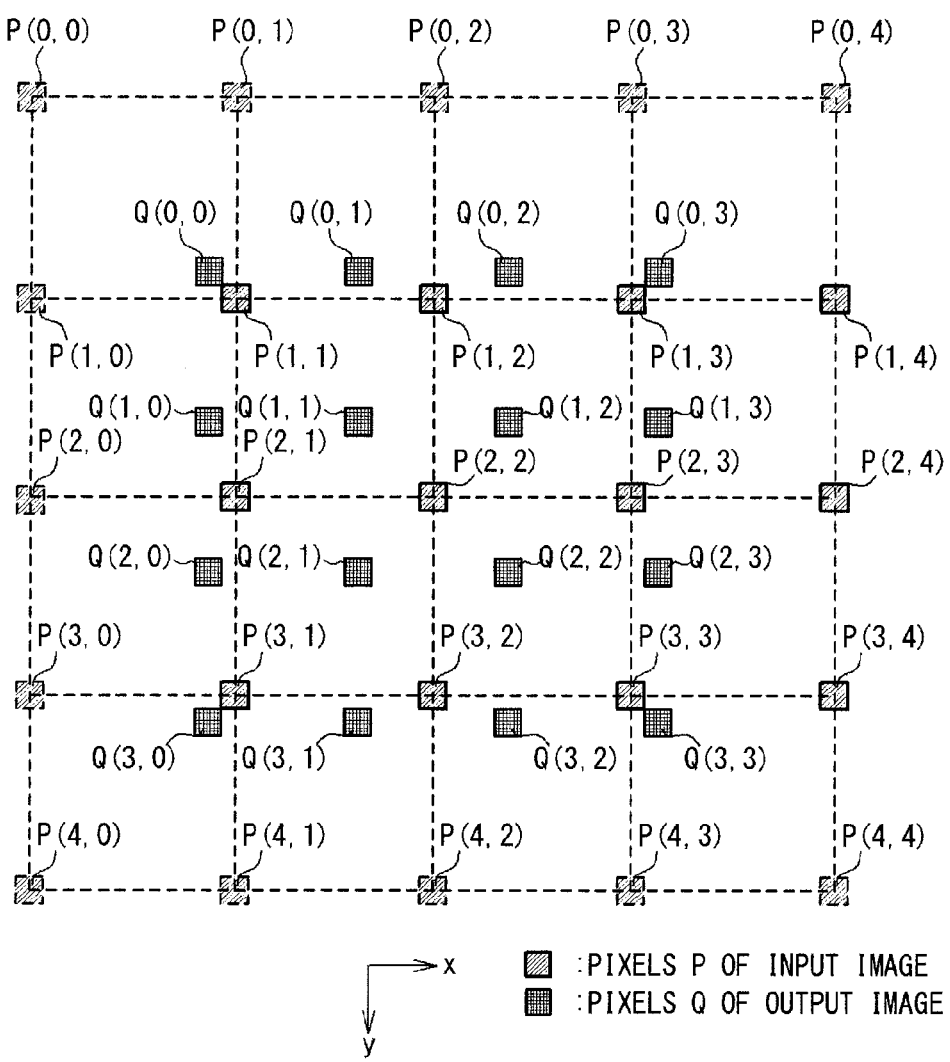
FIG. 3 illustrates the arrangement of 4×4 pixels Q of the output image and 5×5 pixels P of the input image, which are relevant to one unit process of image scaling with a scaling factor of 4/3.

FIG. 3 illustrates the arrangement of 4×4 pixels Q of the output image and 5×5 pixels P of the input image, which are relevant to a certain unit process of image scaling with a scaling factor of 4/3. In the image scaling with a scaling factor of 4/3, pixel data of 4×4 pixels Q of the output image are generated from pixel data of 5×5 pixels P of the input image.

Since calculation of pixel data of each pixel Q of an output image uses one set of interpolation coefficients (t, 1-t, s and 1-s), M×M sets of interpolation coefficients are used for calculation of M×M pixels Q relevant to each unit process. One possible approach may be to store M×M interpolation coefficients in a storage unit (e.g. an ROM (read only memory)) as disclosed in Japanese Patent Application Publication No. H02-176873 A. This approach, however, undesirably causes an increase in the circuit size of the storage unit. Another possible approach is to successively calculate interpolation coefficients, as disclosed in, for example, Japanese Patent Application Publication No. 2011-146888 A. The configuration which successively calculates interpolation coefficients, however, is unfavorable in terms of the processing amount and the circuit size. Image scaling of the present embodiment, which is described below in detail, adopts an approach for reducing hardware resources used to feed interpolation coefficients to a circuit which performs image scaling.

Figure 4:
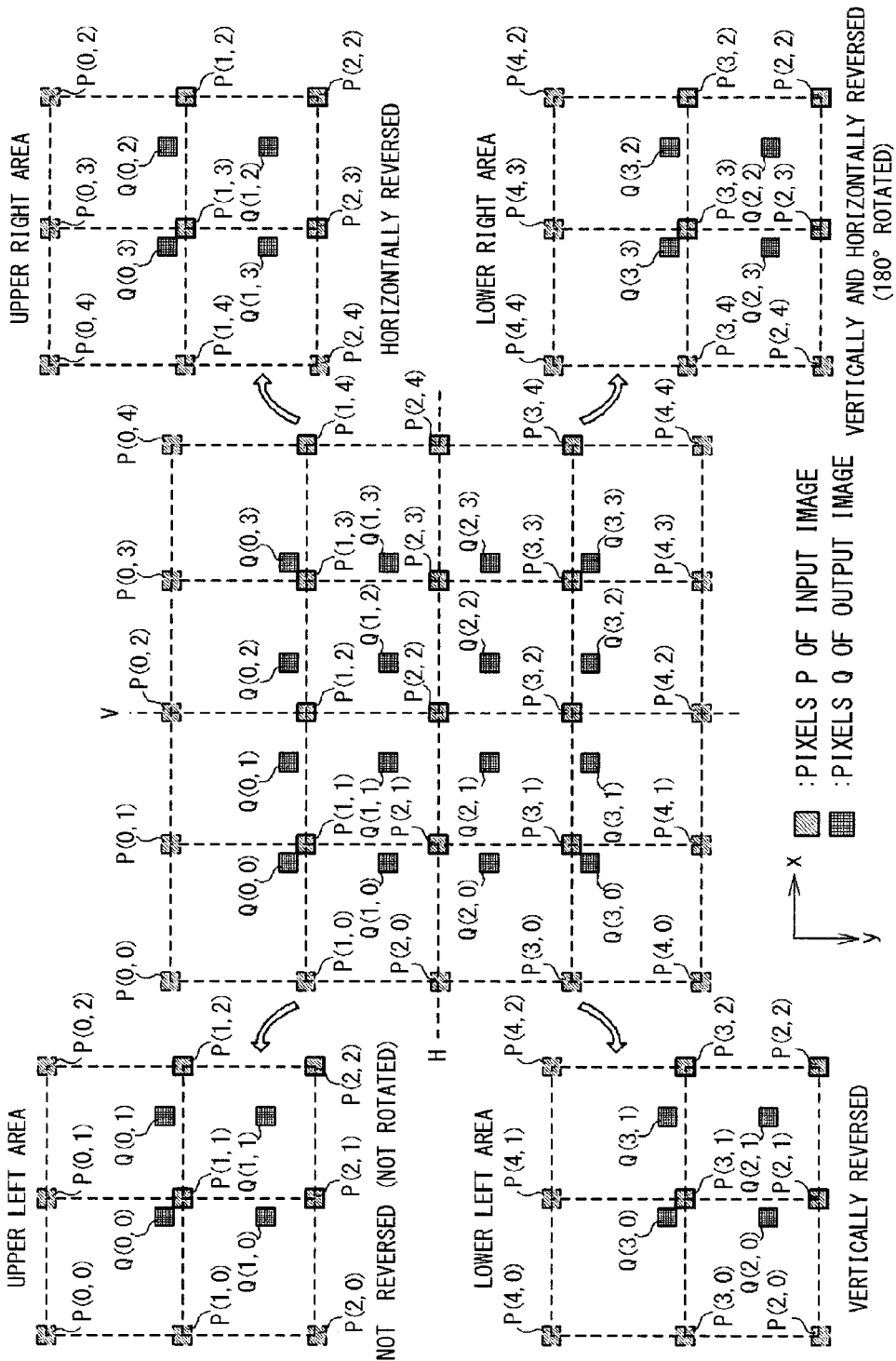
FIG. 4 illustrates the symmetric property in the arrangement of pixels of input and output images in image scaling with a scaling factor of 4/3.

What is focused on by the inventors is the symmetric arrangement of pixels of input and output images with respect to each unit process of bilinear image scaling with a scaling factor of M/N. FIG. 4 illustrates the symmetric property in the arrangement of pixels of input and output images. Illustrated in FIG. 4 is the symmetric property in the arrangement of pixels of input and output images in image scaling with a scaling factor of 4/3, that is, the symmetric property in the arrangement of 5×5 pixels of the input image and 4×4 pixels of the output image.

In the following discussion, four areas are defined in a region in which 5×5 pixels of the input image are arranged: an upper left area, an upper right area, a lower left area and a lower right area. These four areas are defined by dividing the region in which 5×5 pixels of the input image are arranged with straight lines H and V, where the straight line H is extended in the x-axis direction and passes through the center of the region in which the 5×5 pixels of the input image are arranged, and the straight line V is extended in the y-axis direction and passes through the center of the region in which the 5×5 pixels of the input image are arranged. More specifically, the upper left area is defined as a rectangular area with respect to which pixels P(0, 0), P(0, 2), P(2, 0) and P(2, 2) of the input image are defined as vertices, and the upper right area is defined as a rectangular area with respect to which pixels P(0, 2), P(0, 4), P(2, 2) and P(2, 4) of the input image are defined as vertices. Correspondingly, the lower left area is defined as a rectangular area with respect to which pixels P(2, 0), P(2, 2), P(4, 0) and P(4, 2) of the input image are defined as vertices, and the lower right area is defined as a rectangular area with respect to which pixels P(2, 2), P(2, 4), P(4, 2) and P(4, 4) of the input image are defined as vertices. Note that pixel P(i, j) is a pixel positioned in the i-th row and j-th column of the 5×5 pixels of the input image.

Attention should be paid to the fact that the pixel arrangements of the input and output images in the upper right area, lower left area and lower right area are line-symmetric or point-symmetric with respect to the pixel arrangement of the input and output images in the upper left area. In detail, the pixel arrangement of the input and output images in the upper right area and that in the upper left area are line-symmetric about the straight line V. In other words, the pixel arrangement of the input and output images in the upper right area is obtained by a horizontal reversal (a reversal with respect to the straight line V) of the pixel arrangement of the input and output images in the upper left area. As illustrated in the upper right section of FIG. 4, the pixel arrangement obtained by performing a horizontal reversal on the pixel arrangement of the input and output images in the upper right area is identical to that in the upper left area.

Also, the pixel arrangement of the input and output images in the lower left area and that in the upper left area are line-symmetric about the straight line H. In other words, the pixel arrangement of the input and output images in the lower left area is obtained by a vertical reversal (a reversal with respect to the straight line H) of the pixel arrangement of the input and output images in the upper left area. As illustrated in the lower left section of FIG. 4, the pixel arrangement obtained by performing a vertical reversal on the pixel arrangement of the input and output images in the lower left area is identical to that in the upper left area.

Furthermore, the pixel arrangement of the input and output images in the lower right area and that in the upper left area are point-symmetric about a specific point (in this example, pixel P(2, 2)). In other words, the pixel arrangement of the input and output images in the lower right area is obtained by vertical and horizontal reversals (reversals with respect to the straight line V and the straight line H) of the pixel arrangement of the input and output images in the upper left area. As illustrated in the lower right section of FIG. 4, the pixel arrangement obtained by performing vertical and horizontal reversals on the pixel arrangement of the input and output images in the lower right area is identical to that in the upper left area.

Figure 5:
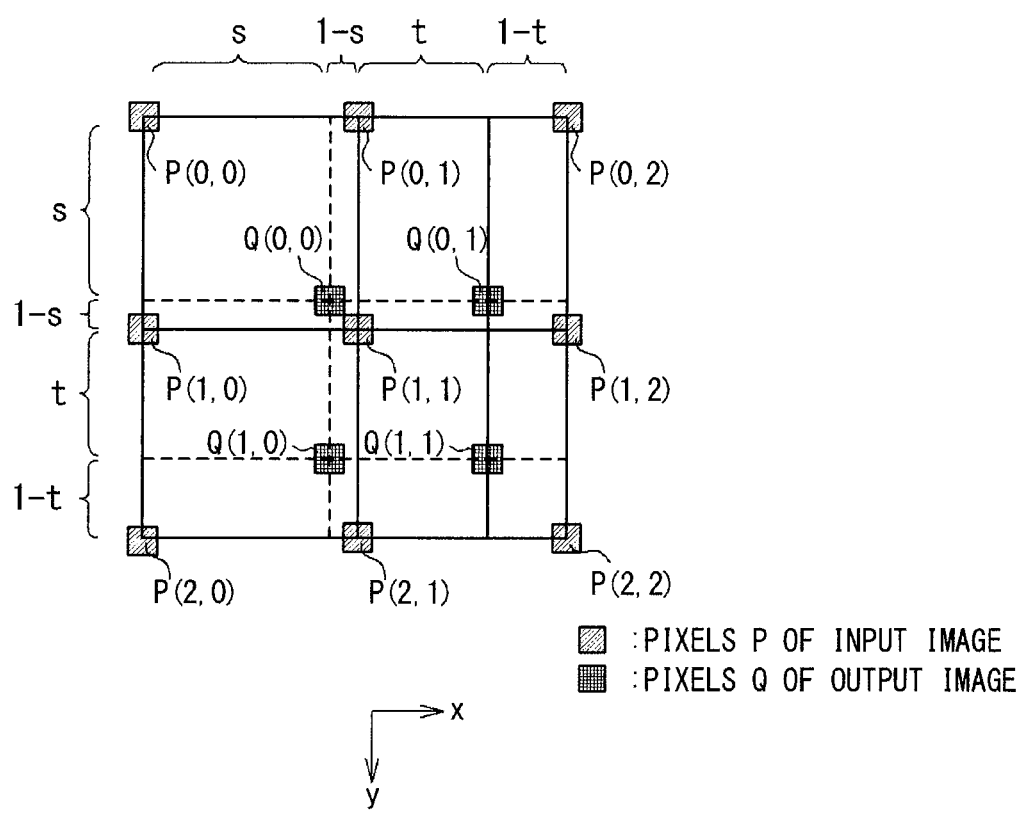
FIG. 5 illustrates an exemplary calculation method of pixel data of pixels Q positioned in the upper left area of the output image.

The number of sets of interpolation coefficients to be fed to a circuitry performing image scaling can be effectively reduced by using the symmetric properties described above. First, FIG. 5 illustrates an exemplary calculation method of pixel data of pixels Q(0, 0), Q(0, 1), Q(1, 0) and Q(1, 1) of the output image, which are positioned in the upper left area. The pixel data of pixel Q(0, 0) of the output image are obtained by linear interpolation of pixel data of pixels P(0, 0), P(0, 1), P(1, 0) and P(1, 1) of the input image. In this linear interpolation, s and 1-s are used as interpolation coefficients for both of the interpolations in the horizontal and vertical directions. The pixel data of pixel Q(0, 1) of the output image are obtained by linear interpolation of pixel data of pixels P(0, 1), P(0, 2), P(1, 1) and P(1, 2) of the input image. In this linear interpolation, t and 1-t are used as interpolation coefficients in the interpolation in the horizontal direction and s and 1-s are used as interpolation coefficients in the interpolation in the vertical direction.

Furthermore, the pixel data of pixel Q(1, 0) of the output image are obtained by linear interpolation of pixel data of pixels P(1, 0), P(1, 1), P(2, 0) and P(2, 1) of the input image. In this linear interpolation, s and 1-s are used as interpolation coefficients in the interpolation in the horizontal direction and t and 1-t are used as interpolation coefficients in the interpolation in the vertical direction. The pixel data of pixel Q(1, 1) of the output image are obtained by linear interpolation of pixel data of pixels P(1, 1), P(1, 2), P(2, 1) and P(2, 2) of the input image. In this linear interpolation, t and 1-t are used as interpolation coefficients for both of the interpolations in the horizontal and vertical directions.

Calculation of pixel data of pixels in the upper right area, the lower left area and the lower right area of the output image can be achieved by performing a horizontal reversal, a vertical reversal and a horizontal-and-vertical reversal, respectively, on the pixel arrangement of the input and output images and then performing the same processing as that performed on the pixel data of the pixels in the upper left area of the output image. A reversal of the pixel arrangement of the input and output images can be achieved by rearranging the pixel data and/or interpolation coefficients. Accordingly, the pixel data of the pixels of the output image positioned in the upper right area, the lower left area and the lower right area can be achieved by preparing a scaling processing section configured to perform the processing illustrated in FIG. 5 (that is, the calculation of image data of pixels in the upper left area of an output image) and performing rearrangement of pixel data of four pixels of the input image and/or interpolation coefficients in feeding the pixel data of the four pixels and the interpolation coefficients. This approach allows reducing the number of sets of interpolation coefficients to be fed to the scaling processing section. The rearrangement of pixel data and/or interpolation coefficients may be achieved with a rearrangement circuit having the function of data selection, such as a selector and a multiplexer. In the following, a description is given of the configuration of an image processing circuit configured to reduce the number of sets of interpolation coefficients to be fed to a scaling processing section by performing rearrangement of pixel data and/or interpolation coefficients.

Figure 6:
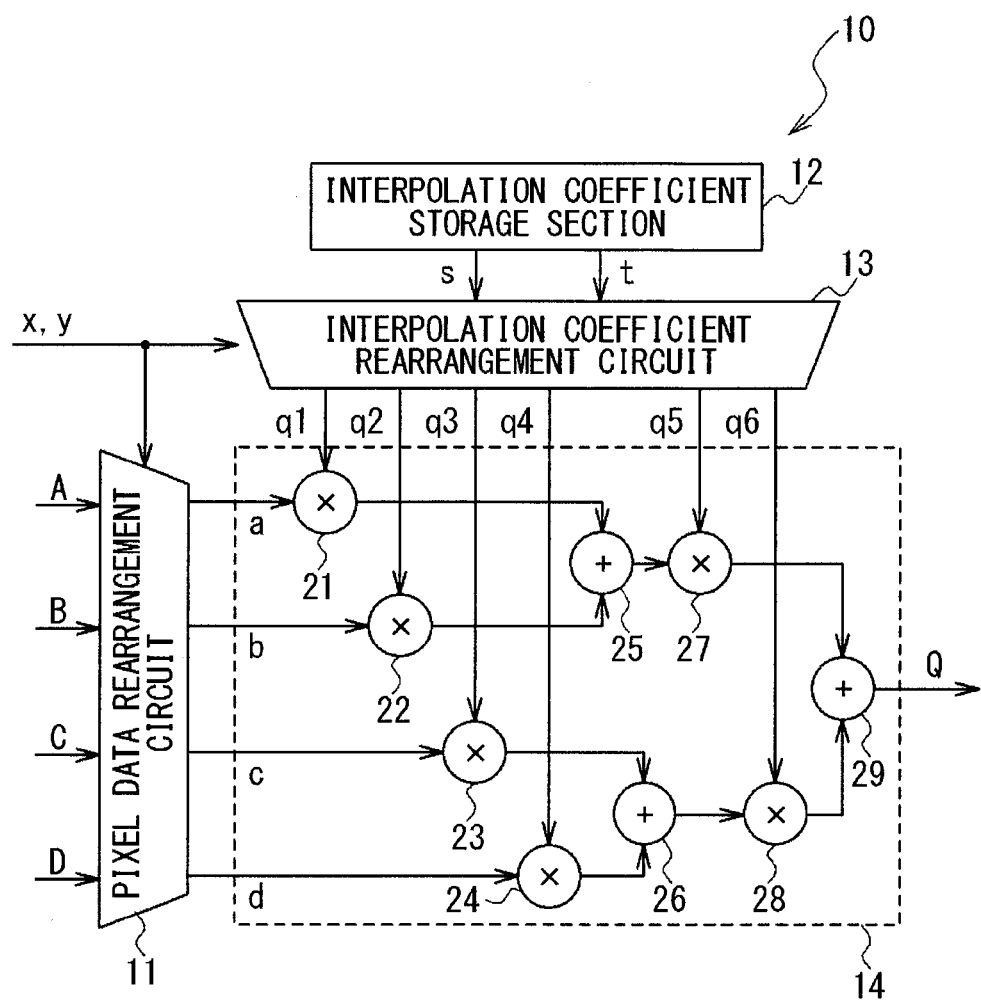
FIG. 6 is a circuit diagram illustrating an exemplary configuration of an image processing circuit which performs image scaling of the present embodiment.

FIG. 6 is a circuit diagram illustrating an exemplary configuration of an image processing circuit 10 which performs image scaling of the present embodiment. The image processing circuit 10 is configured to calculate pixel data of a target pixel Q of an output image from pixel data of four pixels A, B, C and D of an input image, which are arranged as illustrated in FIG. 2. It should be noted that pixel data of the four pixels A, B, C and D of the input image may be also denoted by the symbols "A", "B", "C" and "D" and pixel data of the target pixel Q of the output image may be also denoted by the symbol "Q".

The image processing circuit 10 includes a pixel data rearrangement circuit 11, an interpolation coefficient storage section 12, an interpolation coefficient rearrangement circuit 13 and a scaling processing section 14.

The pixel data rearrangement circuit 11 receives pixel data A, B, C and D of four pixels of input image, and rearranges the pixel data A, B, C and D in a desired order to output to the pixel data inputs a, b, c and d of the scaling processing section 14. This rearrangement is performed on the basis of the coordinates (x, y) of the target pixel Q of the output image, where the coordinate x is indicative of the position of the target pixel Q in the horizontal direction of the output image in a notation of the number of pixels, and the coordinate y is indicative of the position of the target pixel Q in the vertical direction of the output image in a notation of the number of pixels.

FIG. 7A is a truth table illustrating an exemplary operation of the pixel data rearrangement circuit 11 in the present embodiment. The truth table of FIG. 7A indicates that, for example, pixel data A, B, C and D are fed to the pixel data inputs a, b, c and d, respectively, when the following holds for coordinates (x, y):

$(y/2)\%2=0$, and $(x/2)\%2=0$, where the operator "/" indicates a division and the operator "%" indicates a modulo operation, which finds the remainder. A person skilled in the art would understand the operations for different values of $(y/2)\%2$ and $(x/2)\%2$ from the truth table illustrated in FIG. 7A.

Referring back to FIG. 6, the interpolation coefficient storage section 12 stores therein interpolation coefficients s and t and feeds the stored interpolation coefficients s and t to the interpolation coefficient rearrangement circuit 13. It should be noted that the interpolation coefficient storage section 12 only stores the interpolation coefficients s and t necessary for calculating pixel data of pixels positioned in the upper left area of the output image.

The interpolation coefficient rearrangement circuit 13 calculates interpolation coefficients 1-s and 1-t from the interpolation coefficients s and t and feeds an interpolation coefficient selected from the interpolation coefficients s, 1-s, t and 1-t to each of the interpolation coefficient inputs q1 to q6 of the scaling processing section 14, where the interpolation coefficient inputs q1 to q4 are inputs which receive interpolation coefficients used for an interpolation in the horizontal direction and the interpolation coefficient inputs q5 and q6 are inputs which receive interpolation coefficients used for an interpolation in the vertical direction. It should be noted that the interpolation coefficients fed to the interpolation coefficient inputs q1 and q3 have the same value and the interpolation coefficients fed to the interpolation coefficient inputs q2 and q4 have the same value. The interpolation coefficients fed to the interpolation coefficient inputs q1 to q6 are selected in response to the coordinates (x, y) of the target pixel Q of the output image.

FIG. 7B is a truth table illustrating an exemplary operation of the interpolation coefficient rearrangement circuit 13 in the present embodiment. The truth table of FIG. 7B indicates that, for example, interpolation coefficients s, 1-s, s, 1-s, s and 1-s are fed to the interpolation coefficient inputs q1 to q6, respectively, when the following holds for coordinates (x, y):

$$y \%2 = 0, \text{ and}$$

$$x \%2 = 0.$$

A person skilled in the art would understand the operations for different values of y %2 and x %2 from the truth table illustrated in FIG. 7B.

Referring back to FIG. 6, the scaling processing section 14 performs image scaling on four pixel data received on the pixel data inputs a, b, c and d with the interpolation coefficients received on the interpolation coefficient inputs q1 to q6, to calculate pixel data Q of the target pixel of the output image. In detail, the scaling processing section 14, which is configured as a multiply-add circuit performing a multiply-add operation, includes multipliers 21 to 24, adders 25, 26, multipliers 27, 28 and an adder 29.

The multiplier 21 outputs the product of the pixel data received on the pixel data input a and the interpolation coefficient received on the interpolation coefficient input q1, and the multiplier 22 outputs the product of the pixel data received on the pixel data input b and the interpolation coefficient received on the interpolation coefficient input q2. Similarly, the multiplier 23 outputs the product of the pixel data received on the pixel data input c and the interpolation coefficient received on the interpolation coefficient input q3, and the multiplier 24 outputs the product of the pixel data received on the pixel data input d and the interpolation coefficient received on the interpolation coefficient input q4.

The adder 25 outputs the sum of the outputs of the multipliers 21 and 22, and the adder 26 outputs the sum of the outputs of the multipliers 23 and 24.

The multiplier 27 outputs the product of the output of the adder 25 and the interpolation coefficient received on the interpolation coefficient input q5, and the multiplier 28 outputs the product of the output of the adder 26 and the interpolation coefficient received on the interpolation coefficient input q6.

The adder 29 outputs the sum of the outputs of the multipliers 27 and 28. In the image processing circuit 10 of the present embodiment, the output of the adder 29 is used as pixel data of the target pixel Q of the output image.

It should be noted that the interpolation coefficients s and 1-s are represented in the binary notation in an actual implementation of the image processing circuit 10, and therefore the calculation to obtain the interpolation coefficient 1-s from the interpolation coefficient s may be implemented as an operation of subtracting the interpolation coefficient s from a predetermined value. Similarly, the calculation to obtain the interpolation coefficient 1-t from the interpolation coefficient t may be implemented as an operation of subtracting the interpolation coefficient t from a predetermined value.

FIGS. 8A to 8D are timing charts illustrating an exemplary operation of the image processing circuit 10 in the present embodiment. In the following, a description is given of the calculation of pixel data of pixels of an output image with respect to the upper left, upper right, lower left and lower right areas.

(Calculation of Pixel Data of Pixels of Output Image with Respect to the Upper Left and Upper Right Areas)

FIGS. 8A and 8B are timing charts illustrating an exemplary calculation method of pixel data of pixel Q of the output image with respect to the upper left and upper right areas.

FIG. 8A illustrates the operation of the image processing circuit 10 for y=0 (that is, for the calculation of pixel data of pixels Q(0, 0), Q(0, 1), Q(0, 2), Q(0, 3) . . . of the output image). When y=0 and x=0, pixel data of pixel Q(0, 0) of the output image are calculated. As understood from FIG. 4, the pixel data of pixel Q(0, 0) of the output image are calculated from pixel data of pixels P(0, 0), P(0, 1), P(1, 0) and P(1, 1) of the input image. That is, the pixel data of pixels P(0, 0), P(0, 1), P(1, 0) and P(1, 1) are fed as pixel data A, B, C and D. Pixel Q(0, 0) of the output image is positioned in the upper left area as is understood from FIG. 4 and therefore no reversal is performed for the arrangement of pixels P of the input image and pixels Q of the output image in calculating the pixel data of pixel Q(0, 0). Accordingly, the pixel data rearrangement circuit 11 feeds pixel data A, B, C and D, that is, the pixel data of pixels p(0, 0), P(0, 1), P(1, 0) and P(1, 1) of the input image to the pixel data inputs a, b, c and d, respectively.

The interpolation coefficient rearrangement circuit 13 feeds interpolation coefficients for interpolation in the horizontal direction to the interpolation coefficient inputs q1 to q4 and interpolation coefficients for interpolation in the vertical direction to the interpolation coefficient inputs q5 and q6. In other words, the interpolation coefficients s, 1-s, s and 1-s are fed to the interpolation coefficient inputs q1, q2, q3 and q4, respectively, and the interpolation coefficients s and 1-s are fed to the interpolation coefficient inputs q5 and q6, respectively. It would be easily understood from FIG. 5 that, in the calculation of pixel data of pixel Q(0, 0) of the output image, the interpolation coefficients for the interpolation in the horizontal direction are s and 1-s and the interpolation coefficients for the interpolation in the vertical direction are also s and 1-s.

The scaling processing section 14 calculates the pixel data of pixel Q(0, 0) of the output image from the pixel data fed to the pixel data inputs a, b, c and d and the interpolation coefficients fed to the interpolation coefficient inputs q1 to q6. The pixel data of pixel Q(0, 0) are calculated in accordance with the following expression:

$$Q(0,0)=s \cdot (s \cdot P(0,0)+(1-s) \cdot P(0,1))+(1-s) \cdot (s \cdot P(1,0)+(1-s) \cdot P(1,1)),$$

where the operator "·" represents a multiplication.

When y=0 and x=1, pixel data of pixel Q(0, 1) of the output image are calculated. The pixel data of pixel Q(0, 1) of the output image are calculated from pixel data of pixels P(0, 1), P(0, 2), P(1, 1) and P(1, 2) of the input image. That is, the pixel data of pixels P(0, 1), P(0, 2), P(1, 1) and P(1, 2) are fed as pixel data A, B, C and D, respectively.

Pixel Q(0, 1) of the output image is also positioned in the upper left area and therefore no reversal is performed for the arrangement of pixels P of the input image and pixels Q of the output image in calculating pixel data of pixel Q(0, 1). Accordingly, the pixel data rearrangement circuit 11 feeds pixel data A, B, C and D, that is, the pixel data of pixels P(0, 1), P(0, 2), P(1, 1) and P(1, 2) of the input image to the pixel data inputs a, b, c and d, respectively. The interpolation coefficient rearrangement circuit 13, on the other hand, feeds the interpolation coefficients t, 1-t, t and 1-t as the interpolation coefficients for interpolation in the horizontal direction to the interpolation coefficient inputs q1, q2, q3 and q4, respectively, and feeds the interpolation coefficients s and 1-s as the interpolation coefficients for interpolation in the vertical direction to the interpolation coefficient inputs q5 and q6, respectively.

The scaling processing section 14 calculates the pixel data of pixel Q(0, 1) of the output image from the pixel data fed to the pixel data inputs a, b, c and d and the interpolation coefficients fed to the interpolation coefficient inputs q1 to q6. The pixel data of pixel Q(0, 1) are calculated in accordance with the following expression:

$$Q(0,1)=s\cdot(t\cdot P(0,1)+(1-t)\cdot P(0,2))+(1-s)\cdot(t\cdot P(1,1)+(1-t)\cdot P(1,2)).$$

When y=0 and x=2, pixel data of pixel Q(0, 2) of the output image are calculated. The pixel data of pixel Q(0, 2) of the output image are calculated from pixel data of pixels P(0, 2), P(0, 3), P(1, 2) and P(1, 3) of the input image. That is, the pixel data of pixels P(0, 2), P(0, 3), P(1, 2) and P(1, 3) are fed as pixel data A, B, C and D, respectively.

Pixel Q(0, 2) of the output image is positioned in the upper right area as is understood from FIG. 4 and therefore the arrangement of pixels P of the input image and pixels Q of the output image are horizontally reversed. Accordingly, the pixel data rearrangement circuit 11 feeds pixel data B, A, D and C, that is, the pixel data of pixels P(0, 3), P(0, 2), P(1, 3) and P(1, 2) of the input image to the pixel data inputs a, b, c and d, respectively. The interpolation coefficient rearrangement circuit 13, on the other hand, feeds interpolation coefficients to the interpolation coefficient inputs q1 to q6, horizontally reversing the arrangement of pixels P of the input image and pixels Q of the output image. That is, the interpolation coefficient rearrangement circuit 13 feeds the interpolation coefficients t, 1-t, t and 1-t as the interpolation coefficients for interpolation in the horizontal direction to the interpolation coefficient inputs q1, q2, q3 and q4, respectively and feeds the interpolation coefficients s and 1-s as the interpolation coefficients for interpolation in the vertical direction to the interpolation coefficient inputs q5 and q6, respectively. It should be noted that the interpolation coefficients fed to the interpolation coefficient inputs q1 to q6 in the calculation of the pixel data of pixel Q(0, 2) of the output image are the same as the interpolation coefficients fed to the interpolation coefficient inputs q1 to q6 in the calculation of the pixel data of pixel Q(0, 1); note that pixels Q(0, 1) and Q(0, 2) are positioned line-symmetrically about the straight line V.

The scaling processing section 14 calculates the pixel data of pixel Q(0, 2) of the output image from the pixel data fed to the pixel data inputs a, b, c and d and the interpolation coefficients fed to the interpolation coefficient inputs q1 to q6. The pixel data of pixel Q(0, 2) are calculated in accordance with the following expression:

$$Q(0,2)=s\cdot(t\cdot P(0,3)+(1-t)\cdot P(0,2))+(1-s)\cdot(t\cdot P(1,3)+(1-t)\cdot P(1,2)).$$

When y=0 and x=3, pixel data of pixel Q(0, 3) of the output image are calculated. The pixel data of pixel Q(0, 3) of the output image are calculated from pixel data of pixels P(0, 3), P(0, 4), P(1, 3) and P(1, 4) of the input image. That is, the pixel data of pixels P(0, 3), P(0, 4), P(1, 3) and P(1, 4) are fed as pixel data A, B, C and D, respectively.

Pixel Q(0, 3) of the output image is also positioned in the upper right area and therefore the arrangement of pixels P of the input image and pixels Q of the output image are horizontally reversed. Accordingly, the pixel data rearrangement circuit 11 feeds pixel data B, A, D and C, that is, the pixel data of pixels P(0, 4), P(0, 3), P(1, 4) and P(1, 3) of the input image to the pixel data inputs a, b, c and d, respectively. The interpolation coefficient rearrangement circuit 13, on the other hand, feeds interpolation coefficients to the interpolation coefficient inputs q1 to q6, horizontally reversing the arrangement of pixels P of the input image and pixels Q of the output image. That is, the interpolation coefficient rearrangement circuit 13 feeds the interpolation coefficients s, 1-s, s and 1-s as the interpolation coefficients for interpolation in the horizontal direction to the interpolation coefficient inputs q1, q2, q3 and q4, respectively, and feeds the interpolation coefficients s and 1-s as the interpolation coefficients for interpolation in the vertical direction to the interpolation coefficient inputs q5 and q6, respectively. It should be noted that the interpolation coefficients fed to the interpolation coefficient inputs q1 to q6 in the calculation of the pixel data of pixel Q(0, 3) of the output image are the same as the interpolation coefficients fed to the interpolation coefficient inputs q1 to q6 in the calculation of the pixel data of pixel Q(0, 0); note that pixels Q(0, 0) and Q(0, 3) are positioned line-symmetrically about the straight line V.

The scaling processing section 14 calculates the pixel data of pixel Q(0, 3) of the output image from the pixel data fed to the pixel data inputs a, b, c and d and the interpolation coefficients fed to the interpolation coefficient inputs q1 to q6. The pixel data of pixel Q(0, 3) are calculated in accordance with the following expression:

$$Q(0,3)=s\cdot(s\cdot P(0,4)+(1-s)\cdot P(0,3))+(1-s)\cdot(s\cdot P(1,4)+(1-s)\cdot P(1,3)).$$

Pixel data of other pixels Q of the output image with y=0 are calculated similarly to pixels Q(0, 0) to Q(0, 3). Pixel data of pixels Q(0, 4i) and Q(0, 4i+1) (where i is an integer equal to or more than one) are calculated without reversing the arrangement of pixels P of the input image and pixels Q of the output image, similarly to the pixel data of pixels Q(0, 0) and Q(0, 1). Pixel data of pixels Q(0, 4i+2) and Q(0, 4i+3) (where i is an integer equal to or more than one) are calculated with the arrangement of pixels P of the input image and pixels Q of the output image horizontally reversed, similarly to the pixel data of pixels Q(0, 2) and Q(0, 3).

FIG. 8B illustrates the operation of the image processing circuit 10 for y=1 (that is, for the calculation of pixel data of pixels Q(1, 0), Q(1, 1), Q(1, 2), Q(1, 3) . . . of the output image). The calculation of pixel data of pixels Q of the output image for y=1 are achieved in a similar way to the calculation of pixel data of pixels Q of the output image for y=0.

Details are as follows: When y=1 and x=0, pixel data of pixel Q(1, 0) of the output image are calculated. As understood from FIG. 4, the pixel data of pixel Q(1, 0) of the output image are calculated from pixel data of pixels P(1, 0), P(1, 1), P(2, 0) and P(2, 1) of the input image. That is, the pixel data of pixels P(1, 0), P(1, 1), P(2, 0) and P(2, 1) are fed as pixel data A, B, C and D.

Pixel Q(1, 0) of the output image is positioned in the upper left area as is understood from FIG. 4 and therefore no reversal is performed for the arrangement of pixels P of the input image and pixels Q of the output image. Accordingly, the pixel data rearrangement circuit 11 feeds pixel data A, B, C and D, that is, the pixel data of pixels P(1, 0), P(1, 1), P(2, 0) and P(2, 1) of the input image to the pixel data inputs a, b, c and d, respectively. The interpolation coefficient rearrangement circuit 13, on the other hand, feeds the interpolation coefficients s, 1-s, s and 1-s as the interpolation coefficients for interpolation in the horizontal direction to the interpolation coefficient inputs q1, q2, q3 and q4, respectively, and feeds the interpolation coefficients t and 1-t as the interpolation coefficients for interpolation in the vertical direction to the interpolation coefficient inputs q5 and q6, respectively.

The scaling processing section 14 calculates the pixel data of pixel Q(1, 0) of the output image from the pixel data fed to the pixel data inputs a, b, c and d and the interpolation coefficients fed to the interpolation coefficient inputs q1 to q6. The pixel data of pixel Q(1, 0) are calculated in accordance with the following expression:

$$Q(1,0)=t\cdot(s\cdot P(1,0)+(1-s)\cdot P(1,1))+(1-t)\cdot(s\cdot P(2,0)+(1-s)\cdot P(2,1)).$$

When y=1 and x=1, pixel data of pixel Q(1, 1) of the output image are calculated. The pixel data of pixel Q(1, 1) of the output image are calculated from pixel data of pixels P(1, 1), P(1, 2), P(2, 1) and P(2, 2) of the input image. That is, the pixel data of pixels P(1, 1), P(1, 2), P(2, 1) and P(2, 2) are fed as pixel data A, B, C and D, respectively.

Pixel Q(1, 1) of the output image is also positioned in the upper left area and therefore no reversal is performed for the arrangement of pixels P of the input image and pixels Q of the output image. Accordingly, the pixel data rearrangement circuit 11 feeds pixel data A, B, C and D, that is, the pixel data of pixels P(1, 1), P(1, 2), P(2, 1) and P(2, 2) of the input image to the pixel data inputs a, b, c and d, respectively. The interpolation coefficient rearrangement circuit 13, on the other hand, feeds the interpolation coefficients t, 1-t, t and 1-t as the interpolation coefficients for interpolation in the horizontal direction to the interpolation coefficient inputs q1, q2, q3 and q4, respectively, and feeds the interpolation coefficients t and 1-t as the interpolation coefficients for interpolation in the vertical direction to the interpolation coefficient inputs q5 and q6, respectively.

The scaling processing section 14 calculates the pixel data of pixel Q(1, 1) of the output image from the pixel data fed to the pixel data inputs a, b, c and d and the interpolation coefficients fed to the interpolation coefficient inputs q1 to q6. The pixel data of pixel Q(1, 1) are calculated in accordance with the following expression:

$$Q(1,1)=t\cdot(t\cdot P(1,1)+(1-t)\cdot P(1,2))+(1-t)\cdot(t\cdot P(2,1)+(1-t)\cdot P(2,2)).$$

When y=1 and x=2, pixel data of pixel Q(1, 2) of the output image are calculated. The pixel data of pixel Q(1, 2) of the output image are calculated from pixel data of pixels P(1, 2), P(1, 3), P(2, 2) and P(2, 3) of the input image. That is, the pixel data of pixels P(1, 2), P(1, 3), P(2, 2) and P(2, 3) are fed as pixel data A, B, C and D, respectively.

Pixel Q(1, 2) of the output image is positioned in the upper right area as is understood from FIG. 4 and therefore the arrangement of pixels P of the input image and pixels Q of the output image are horizontally reversed. Accordingly, the pixel data rearrangement circuit 11 feeds pixel data B, A, D and C, that is, the pixel data of pixels P(1, 3), P(1, 2), P(2, 3) and P(2, 2) of the input image to the pixel data inputs a, b, c and d, respectively. The interpolation coefficient rearrangement circuit 13, on the other hand, feeds interpolation coefficients to the interpolation coefficient inputs q1 to q6, horizontally reversing the arrangement of pixels P of the input image and pixels Q of the output image. That is, the interpolation coefficient rearrangement circuit 13 feeds the interpolation coefficients t, 1-t, t and 1-t as the interpolation coefficients for interpolation in the horizontal direction to the interpolation coefficient inputs q1, q2, q3 and q4, respectively, and feeds the interpolation coefficients t and 1-t as the interpolation coefficients for interpolation in the vertical direction to the interpolation coefficient inputs q5 and q6, respectively. It should be noted that the interpolation coefficients fed to the interpolation coefficient inputs q1 to q6 in the calculation of the pixel data of pixel Q(1, 2) of the output image are the same as the interpolation coefficients fed to the interpolation coefficient inputs q1 to q6 in the calculation of the pixel data of pixel Q(1, 1); note that pixels Q(1, 1) and Q(1, 2) are positioned line-symmetrically about the straight line V. The scaling processing section 14 calculates the pixel data of pixel Q(1, 2) of the output image from the pixel data fed to the pixel data inputs a, b, c and d and the interpolation coefficients fed to the interpolation coefficient inputs q1 to q6. The pixel data of pixel Q(1, 2) are calculated in accordance with the following expression:

$$Q(1,2)=t\cdot(t\cdot P(1,3)+(1-t)\cdot P(1,2))+(1-t)\cdot(t\cdot P(2,3)+(1-t)\cdot P(2,2)).$$

When y=1 and x=3, pixel data of pixel Q(1, 3) of the output image are calculated. The pixel data of pixel Q(1, 3) of the output image are calculated from pixel data of pixels P(1, 3), P(1, 4), P(2, 3) and P(2, 4) of the input image. That is, the pixel data of pixels P(1, 3), P(1, 4), P(2, 3) and P(2, 4) are fed as pixel data A, B, C and D, respectively.

Pixel Q(1, 3) of the output image is also positioned in the upper right area and therefore the arrangement of pixels P of the input image and pixels Q of the output image are horizontally reversed. Accordingly, the pixel data rearrangement circuit 11 feeds pixel data B, A, D and C, that is, the pixel data of pixels P(1, 4), P(1, 3), P(2, 4) and P(2, 3) of the input image to the pixel data inputs a, b, c and d, respectively. The interpolation coefficient rearrangement circuit 13, on the other hand, feeds interpolation coefficients to the interpolation coefficient inputs q1 to q6, horizontally reversing the arrangement of pixels P of the input image and pixels Q of the output image. That is, the interpolation coefficient rearrangement circuit 13 feeds the interpolation coefficients s, 1-s, s and 1-s as the interpolation coefficients for interpolation in the horizontal direction to the interpolation coefficient inputs q1, q2, q3 and q4, respectively, and feeds the interpolation coefficients t and 1-t as the interpolation coefficients for interpolation in the vertical direction to the interpolation coefficient inputs q5 and q6, respectively. It should be noted that the interpolation coefficients fed to the interpolation coefficient inputs q1 to q6 in the calculation of the pixel data of pixel Q(1, 3) of the output image are the same as the interpolation coefficients fed to the interpolation coefficient inputs q1 to q6 in the calculation of the pixel data of pixel Q(1, 0); note that pixels Q(1, 0) and Q(1, 3) are positioned line-symmetrically about the straight line V.

The scaling processing section 14 calculates the pixel data of pixel Q(1, 3) of the output image from the pixel data fed to the pixel data inputs a, b, c and d and the interpolation coefficients fed to the interpolation coefficient inputs q1 to q6. The pixel data of pixel Q(1, 3) are calculated in accordance with the following expression:

$$Q(1,3)=t\cdot(s\cdot P(1,4)+(1-s)\cdot P(1,3))+(1-t)\cdot(s\cdot P(2,4)+(1-s)\cdot P(2,3)).$$

Pixel data of other pixels Q of the output image with y=1 are calculated similarly to pixels Q(1, 0) to Q(1, 3). Pixel data of pixels Q(1, 4i) and Q(1, 4i+1) (where i is an integer equal to or more than one) are calculated without reversing the arrangement of pixels P of the input image and pixels Q of the output image, similarly to the pixel data of pixels Q(1, 0) and Q(1, 1). Pixel data of pixels Q(1, 4i+2) and Q(1, 4i+3) (where i is an integer equal to or more than one) are calculated with the arrangement of pixels P of the input image and pixels Q of the output image horizontally reversed, similarly to the pixel data of pixels Q(1, 2) and Q(1, 3).

(Calculation of Pixel Data of Pixels of Output Image with Respect to the Lower Left and Lower Right Areas)

FIGS. 8C and 8D are timing charts illustrating an exemplary calculation method of pixel data of pixel Q of the output image with respect to the lower left and lower right areas.

FIG. 8C illustrates the operation of the image processing circuit 10 for y=2 (that is, for the calculation of pixel data of pixels Q(2, 0), Q(2, Q(2, 2), Q(2, 3) . . . of the output image).

When y=2 and x=0, pixel data of pixel Q(2, 0) of the output image are calculated. As understood from FIG. 4, the pixel data of pixel Q(2, 0) of the output image are calculated from pixel data of pixels P(2, 0), P(2, 1), P(3, 0) and P(3, 1) of the input image. That is, the pixel data of pixels P(2, 0), P(2, 1), P(3, 0) and P(3, 1) are fed as pixel data A, B, C and D, respectively.

Pixel Q(2, 0) of the output image is positioned in the lower left area as is understood from FIG. 4 and therefore the arrangement of pixels P of the input image and pixels Q of the output image are vertically reversed. Accordingly, the pixel data rearrangement circuit 11 feeds pixel data C, D, A and B, that is, the pixel data of pixels P(3, 0), P(3, 1), P(2, 0) and P(2, 1) of the input image to the pixel data inputs a, b, c and d, respectively. The interpolation coefficient rearrangement circuit 13, on the other hand, feeds the interpolation coefficients s, 1-s, s and 1-s as the interpolation coefficients for interpolation in the horizontal direction to the interpolation coefficient inputs q1, q2, q3 and q4, respectively, and feeds the interpolation coefficients t and 1-t as the interpolation coefficients for interpolation in the vertical direction to the interpolation coefficient inputs q5 and q6, respectively. It should be noted that the interpolation coefficients fed to the interpolation coefficient inputs q1 to q6 in the calculation of the pixel data of pixel Q(2, 0) of the output image are the same as the interpolation coefficients fed to the interpolation coefficient inputs q1 to q6 in the calculation of the pixel data of pixel Q(1, 0); note that pixels Q(1, 0) and Q(2, 0) are positioned line-symmetrically about the straight line H.

The scaling processing section 14 calculates the pixel data of pixel Q(2, 0) of the output image from the pixel data fed to the pixel data inputs a, b, c and d and the interpolation coefficients fed to the interpolation coefficient inputs q1 to q6. The pixel data of pixel Q(2, 0) are calculated in accordance with the following expression:

$Q(2,0)=t\cdot(s\cdot P(3,0)+(1-s)\cdot P(3,1))+(1-t)\cdot(s\cdot P(2,0)+(1-s)\cdot P(2,1))$.

When y=2 and x=1, pixel data of pixel Q(2, 1) of the output image are calculated. The pixel data of pixel Q(2, 1) of the output image are calculated from pixel data of pixels P(2, 1), P(2, 2), P(3, 1) and P(3, 2) of the input image. That is, the pixel data of pixels P(2, 1), P(2, 2), P(3, 1) and P(3, 2) are fed as pixel data A, B, C and D, respectively.

Pixel Q(2, 1) of the output image is also positioned in the lower left area and therefore the arrangement of pixels P of the input image and pixels Q of the output image are vertically reversed. Accordingly, the pixel data rearrangement circuit 11 feeds pixel data C, D, A and B, that is, the pixel data of pixels P(3, 1), P(3, 2), P(2, 1) and P(2, 2) of the input image to the pixel data inputs a, b, c and d, respectively. The interpolation coefficient rearrangement circuit 13, on the other hand, feeds the interpolation coefficients t, 1-t, t and 1-t as the interpolation coefficients for interpolation in the horizontal direction to the interpolation coefficient inputs q1, q2, q3 and q4, respectively, and feeds the interpolation coefficients t and 1-t as the interpolation coefficients for interpolation in the vertical direction to the interpolation coefficient inputs q5 and q6, respectively. The scaling processing section 14 calculates the pixel data of pixel Q(2, 1) of the output image from the pixel data fed to the pixel data inputs a, b, c and d and the interpolation coefficients fed to the interpolation coefficient inputs q1 to q6. The pixel data of pixel Q(2, 1) are calculated in accordance with the following expression:

$Q(2,1)=t\cdot(t\cdot P(3,1)+(1-t)\cdot P(3,2))+(1-t)\cdot(t\cdot P(2,1)+(1-t)\cdot P(2,2))$.

When y=2 and x=2, pixel data of pixel Q(2, 2) of the output image are calculated. The pixel data of pixel Q(2, 2) of the output image are calculated from pixel data of pixels P(2, 2), P(2, 3), P(3, 2) and P(3, 3) of the input image. That is, the pixel data of pixels P(2, 2), P(2, 3), P(3, 2) and P(3, 3) are fed as pixel data A, B, C and D, respectively.

Pixel Q(2, 2) of the output image is positioned in the lower right area as understood from FIG. 4, and therefore the arrangement of pixels P of the input image and pixels Q of the output image are vertically and horizontally reversed (or 180-degrees rotated). Accordingly, the pixel data rearrangement circuit 11 feeds pixel data D, C, B and A, that is, the pixel data of pixels P(3, 3), P(3, 2), P(2, 3) and P(2, 2) of the input image to the pixel data inputs a, b, c and d, respectively. The interpolation coefficient rearrangement circuit 13, on the other hand, feeds interpolation coefficients to the interpolation coefficient inputs q1 to q6, vertically and horizontally reversing the arrangement of pixels P of the input image and pixels Q of the output image. The interpolation coefficient rearrangement circuit 13 feeds the interpolation coefficients t, 1-t, t and 1-t as the interpolation coefficients for interpolation in the horizontal direction to the interpolation coefficient inputs q1, q2, q3 and q4, respectively, and feeds the interpolation coefficients t and 1-t as the interpolation coefficients for interpolation in the vertical direction to the interpolation coefficient inputs q5 and q6, respectively. It should be noted that the interpolation coefficients fed to the interpolation coefficient inputs q1 to q6 in the calculation of the pixel data of pixel Q(2, 2) of the output image are the same as the interpolation coefficients fed to the interpolation coefficient inputs q1 to q6 in the calculation of the pixel data of pixel Q(1, 1); note that pixels Q(1, 1) and Q(2, 2) are positioned point-symmetrically.

The scaling processing section 14 calculates the pixel data of pixel Q(2, 2) of the output image from the pixel data fed to the pixel data inputs a, b, c and d and the interpolation coefficients fed to the interpolation coefficient inputs q1 to q6. The pixel data of pixel Q(2, 2) are calculated in accordance with the following expression:

$Q(2,2)=t\cdot(t\cdot P(3,3)+(1-t)\cdot P(3,2))+(1-t)\cdot(t\cdot P(2,3)+(1-t)\cdot P(2,2))$.

When y=2 and x=3, pixel data of pixel Q(2, 3) of the output image are calculated. The pixel data of pixel Q(2, 3) of the output image are calculated from pixel data of pixels P(2, 3), P(2, 4), P(3, 3) and P(3, 4) of the input image. That is, the pixel data of pixels P(2, 3), P(2, 4), P(3, 3) and P(3, 4) are fed as pixel data A, B, C and D, respectively.

Pixel Q(2, 3) of the output image is also positioned in the lower right area and therefore the arrangement of pixels P of the input image and pixels Q of the output image are vertically and horizontally reversed. Accordingly, the pixel data rearrangement circuit 11 feeds pixel data D, C, B and A, that is, the pixel data of pixels P(3, 4), P(3, 3), P(2, 4) and P(2, 3) of the input image to the pixel data inputs a, b, c and d, respectively. The interpolation coefficient rearrangement circuit 13, on the other hand, feeds interpolation coefficients to the interpolation coefficient inputs q1 to q6, vertically and horizontally reversing the arrangement of pixels P of the input image and pixels Q of the output image. The interpolation coefficient rearrangement circuit 13 feeds the interpolation coefficients s, 1-s, s and 1-s as the interpolation coefficients for interpolation in the horizontal direction to the interpolation coefficient inputs q1, q2, q3 and q4, respectively, and feeds the interpolation coefficients t and 1-t as the interpolation coefficients for interpolation in the vertical direction to the interpolation coefficient inputs q5 and q6, respectively. It should be noted that the interpolation coefficients fed to the interpolation coefficient inputs q1 to q6 in the calculation of the pixel data of pixel Q(2, 3) of the output image are the same as the interpolation coefficients fed to the interpolation coefficient inputs q1 to q6 in the calculation of the pixel data of pixel Q(1, 0); note that pixels Q(1, 0) and Q(2, 3) are positioned point-symmetrically.

The scaling processing section 14 calculates the pixel data of pixel Q(2, 3) of the output image from the pixel data fed to the pixel data inputs a, b, c and d and the interpolation coefficients fed to the interpolation coefficient inputs q1 to q6. The pixel data of pixel Q(2, 3) are calculated in accordance with the following expression:

$$Q(2,3)=t\cdot(s\cdot P(3,4)+(1-s)\cdot P(3,3))+(1-t)\cdot(s\cdot P(2,4)+(1-s)\cdot P(2,3)).$$

Pixel data of other pixels Q of the output image with y=2 are calculated similarly to pixels Q(2, 0) to Q(2, 3). Pixel data of pixels Q(2, 4i) and Q(2, 4i+1) (where i is an integer equal to or more than one) are calculated with the arrangement of pixels P of the input image and pixels Q of the output image vertically reversed, similarly to the pixel data of pixels Q(2, 0) and Q(2, 1). Pixel data of pixels Q(2, 4i+2) and Q(2, 4i+3) (where i is an integer equal to or more than one) are calculated with the arrangement of pixels P of the input image and pixels Q of the output image vertically and horizontally reversed, similarly to the pixel data of pixels Q(2, 2) and Q(2, 3).

FIG. 8D illustrates the operation of the image processing circuit 10 for y=3 (that is, for the calculation of pixel data of pixels Q(3, 0), Q(3, 1), Q(3, 2), Q(3, 3)." of the output image). The calculation of pixel data of pixels Q of the output image for y=3 are achieved in a similar way to the calculation of pixel data of pixels Q of the output image for y=2.

When y=3 and x=0, pixel data of pixel Q(3, 0) of the output image are calculated. As understood from FIG. 4, the pixel data of pixel Q(3, 0) of the output image are calculated from pixel data of pixels P(3, 0), P(3, 1), P(4, 0) and P(4, 1) of the input image. That is, the pixel data of pixels P(3, 0), P(3, 1), P(4, 0) and P(4, 1) are fed as pixel data A, B, C and D.

Pixel Q(3, 0) of the output image is positioned in the lower left area as is understood from FIG. 4 and therefore the arrangement of pixels P of the input image and pixels Q of the output image are vertically reversed. Accordingly, the pixel data rearrangement circuit 11 feeds pixel data C, D, A and B, that is, the pixel data of pixels P(4, 0), P(4, 1), P(3, 0) and P(3, 1) of the input image to the pixel data inputs a, b, c and d, respectively. The interpolation coefficient rearrangement circuit 13, on the other hand, feeds the interpolation coefficients s, 1-s, s and 1-s as the interpolation coefficients for interpolation in the horizontal direction to the interpolation coefficient inputs q1, q2, q3 and q4, respectively, and feeds the interpolation coefficients s and 1-s as the interpolation coefficients for interpolation in the vertical direction to the interpolation coefficient inputs q5 and q6, respectively. It should be noted that the interpolation coefficients fed to the interpolation coefficient inputs q1 to q6 in the calculation of the pixel data of pixel Q(3, 0) of the output image are the same as the interpolation coefficients fed to the interpolation coefficient inputs q1 to q6 in the calculation of the pixel data of pixel Q(0, 0); note that pixels Q(0, 0) and Q(3, 0) are positioned line-symmetrically about the straight line H.

The scaling processing section 14 calculates the pixel data of pixel Q(3, 0) of the output image from the pixel data fed to the pixel data inputs a, b, c and d and the interpolation coefficients fed to the interpolation coefficient inputs q1 to q6. The pixel data of pixel Q(3, 0) are calculated in accordance with the following expression:

$$Q(3,0)=s\cdot(s\cdot P(4,0)+(1-s)\cdot P(4,1))+(1-s)\cdot(s\cdot P(3,0)+(1-s)\cdot P(3,1)).$$

When y=3 and x=1, pixel data of pixel Q(3, 1) of the output image are calculated. The pixel data of pixel Q(3, 1) of the output image are calculated from pixel data of pixels P(3, 1), P(3, 2), P(4, 1) and P(4, 2) of the input image. That is, the pixel data of pixels P(3, 1), P(3, 2), P(4, 1) and P(4, 2) are fed as pixel data A, B, C and D, respectively.

Pixel Q(3, 1) of the output image is also positioned in the lower left area and therefore the arrangement of pixels P of the input image and pixels Q of the output image are vertically reversed. Accordingly, the pixel data rearrangement circuit 11 feeds pixel data C, D, A and B, that is, the pixel data of pixels P(4, 1), P(4, 2), P(3, 1) and P(3, 2) of the input image to the pixel data inputs a, b, c and d, respectively. The interpolation coefficient rearrangement circuit 13, on the other hand, feeds the interpolation coefficients t, 1-t, t and 1-t as the interpolation coefficients for interpolation in the horizontal direction to the interpolation coefficient inputs q1, q2, q3 and q4, respectively, and feeds the interpolation coefficients s and 1-s as the interpolation coefficients for interpolation in the vertical direction to the interpolation coefficient inputs q5 and q6, respectively. The scaling processing section 14 calculates the pixel data of pixel Q(3, 1) of the output image from the pixel data fed to the pixel data inputs a, b, c and d and the interpolation coefficients fed to the interpolation coefficient inputs q1 to q6. The pixel data of pixel Q(3, 1) are calculated in accordance with the following expression:

$$Q(3,1)=s\cdot(t\cdot P(4,1)+(1-t)\cdot P(4,2))+(1-s)\cdot(t\cdot P(3,1)+(1-t)\cdot P(3,2)).$$

When y=3 and x=2, pixel data of pixel Q(3, 2) of the output image are calculated. The pixel data of pixel Q(3, 2) of the output image are calculated from pixel data of pixels P(3, 2), P(3, 3), P(4, 2) and P(4, 3) of the input image. That is, the pixel data of pixels P(3, 2), P(3, 3), P(4, 2) and P(4, 3) are fed as pixel data A, B, C and D, respectively.

Pixel Q(3, 2) of the output image is positioned in the lower right area as understood from FIG. 4, and therefore the arrangement of pixels P of the input image and pixels Q of the output image are vertically and horizontally reversed (or 180-degrees rotated). Accordingly, the pixel data rearrangement circuit 11 feeds pixel data D, C, B and A, that is, the pixel data of pixels P(4, 3), P(4, 2), P(3, 3) and P(3, 2) of the input image to the pixel data inputs a, b, c and d, respectively. The interpolation coefficient rearrangement circuit 13, on the other hand, feeds interpolation coefficients to the interpolation coefficient inputs q1 to q6, vertically and horizontally reversing the arrangement of pixels P of the input image and pixels Q of the output image. The interpolation coefficient rearrangement circuit 13 feeds the interpolation coefficients t, 1-t, t and 1-t as the interpolation coefficients for interpolation in the horizontal direction to the interpolation coefficient inputs q1, q2, q3 and q4, respectively, and feeds the interpolation coefficients s and 1-s as the interpolation coefficients for interpolation in the vertical direction to the interpolation coefficient inputs q5 and q6, respectively. It should be noted that the interpolation coefficients fed to the interpolation coefficient inputs q1 to q6 in the calculation of the pixel data of pixel Q(3, 2) of the output image are the same as the interpolation coefficients fed to the interpolation coefficient inputs q1 to q6 in the calculation of the pixel data of pixel Q(0, 1); note that pixels Q(0, 1) and Q(3, 2) are positioned point-symmetrically.

The scaling processing section 14 calculates the pixel data of pixel Q(3, 2) of the output image from the pixel data fed to the pixel data inputs a, b, c and d and the interpolation coefficients fed to the interpolation coefficient inputs q1 to q6. The pixel data of pixel Q(3, 2) are calculated in accordance with the following expression:

$$Q(3,2)=s \cdot (t \cdot P(4,3)+(1-t) \cdot P(4,2))+(1-s) \cdot (t \cdot P(3,3)+(1-t) \cdot P(3,2)).$$

When y=3 and x=3, pixel data of pixel Q(3, 3) of the output image are calculated. The pixel data of pixel Q(3, 3) of the output image are calculated from pixel data of pixels P(3, 3), P(3, 4), P(4, 3) and P(4, 4) of the input image. That is, the pixel data of pixels P(3, 3), P(3, 4), P(4, 3) and P(4, 4) are fed as pixel data A, B, C and D, respectively.

Pixel Q(3, 3) of the output image is also positioned in the lower right area and therefore the arrangement of pixels P of the input image and pixels Q of the output image are vertically and horizontally reversed. Accordingly, the pixel data rearrangement circuit 11 feeds pixel data D, C, B and A, that is, the pixel data of pixels P(4, 4), P(4, 3), P(3, 4) and P(3, 3) of the input image to the pixel data inputs a, b, c and d, respectively. The interpolation coefficient rearrangement circuit 13, on the other hand, feeds interpolation coefficients to the interpolation coefficient inputs q1 to q6, vertically and horizontally reversing the arrangement of pixels P of the input image and pixels Q of the output image. The interpolation coefficient rearrangement circuit 13 feeds the interpolation coefficients s, 1-s, s and 1-s as the interpolation coefficients for interpolation in the horizontal direction to the interpolation coefficient inputs q1, q2, q3 and q4, respectively, and feeds the interpolation coefficients s and 1-s as the interpolation coefficients for interpolation in the vertical direction to the interpolation coefficient inputs q5 and q6, respectively. It should be noted that the interpolation coefficients fed to the interpolation coefficient inputs q1 to q6 in the calculation of the pixel data of pixel Q(3, 3) of the output image are the same as the interpolation coefficients fed to the interpolation coefficient inputs q1 to q6 in the calculation of the pixel data of pixel Q(0, 0); note that pixels Q(0, 0) and Q(3, 3) are positioned point-symmetrically.

The scaling processing section 14 calculates the pixel data of pixel Q(3, 3) of the output image from the pixel data fed to the pixel data inputs a, b, c and d and the interpolation coefficients fed to the interpolation coefficient inputs q1 to q6. The pixel data of pixel Q(3, 3) are calculated in accordance with the following expression:

$$Q(3,3)=s \cdot (s \cdot P(4,4)+(1-s) \cdot P(4,3))+(1-s) \cdot (s \cdot P(3,4)+(1-s) \cdot P(3,3)).$$

Pixel data of other pixels Q of the output image with y=3 are calculated similarly to pixels Q(3, 0) to Q(3, 3). Pixel data of pixels Q(3, 4i) and Q(3, 4i+1) (where i is an integer equal to or more than one) are calculated with the arrangement of pixels P of the input image and pixels Q of the output image vertically reversed, similarly to the pixel data of pixels Q(3, 0) and Q(3, 1). Pixel data of pixels Q(3, 4i+2) and Q(3, 4i+3) (where i is an integer equal to or more than one) are calculated with the arrangement of pixels P of the input image and pixels Q of the output image vertically and horizontally reversed, similarly to the pixel data of pixels Q(3, 2) and Q(3, 3).

Pixel data of pixels Q of the output image are similarly calculated when y is equal to or more than four. Pixel data of pixels Q of the output image for y=4j (j is an integer equal to or more than one) are calculated similarly to those for y=0, and Pixel data of pixels Q of the output image for y=4j+1 are calculated similarly to those for y=1. Pixel data of pixels Q of the output image for y=4j+2 are calculated similarly to those for y=2, and Pixel data of pixels Q of the output image for y=4j+3 are calculated similarly to those for y=3.

For other values of M and N, pixel data of pixels Q of the output image can be calculated with the image processing circuit 10 configured as illustrated in FIG. 6 by appropriately modifying the rearrangement of pixel data by the pixel data rearrangement circuit 11 and the rearrangement of interpolation coefficients by the interpolation coefficient rearrangement circuit 13.

It should be noted however that a discussion is given below with respect to the four areas defined in the region in which (N+2)×(N+2) pixels of the input image are arranged, which are relevant to calculation of pixel data of M×M pixels of the output image, which is a unit processing of image scaling. In image scaling with a scaling factor of M/N for M being an even number, as described above, four areas symmetric with one another in terms of the pixel arrangement can be defined by dividing the region in which (N+2)×(N+2) pixels of the input image are arranged, which are relevant to a unit process of image scaling, that is, calculation of pixel data of M×M pixels of the output image, into the four areas: the upper left, upper right, lower left and lower right areas (also refer to FIG. 4, which illustrates the example for M being four). Note that the four areas are defined so as not to overlap one another.

For M being an odd number, on the other hand, four areas symmetric with one another in terms of the pixel arrangement cannot be defined by dividing the region in which (N+2)×(N+2) pixels of the input image are arranged into four non-overlapping areas. Nevertheless, as discussed in the following, four areas symmetric with one another in terms of the pixel arrangement of pixels of input and output images can be defined for M being an odd number, if the four areas are allowed to overlap one another.

Figure 9:
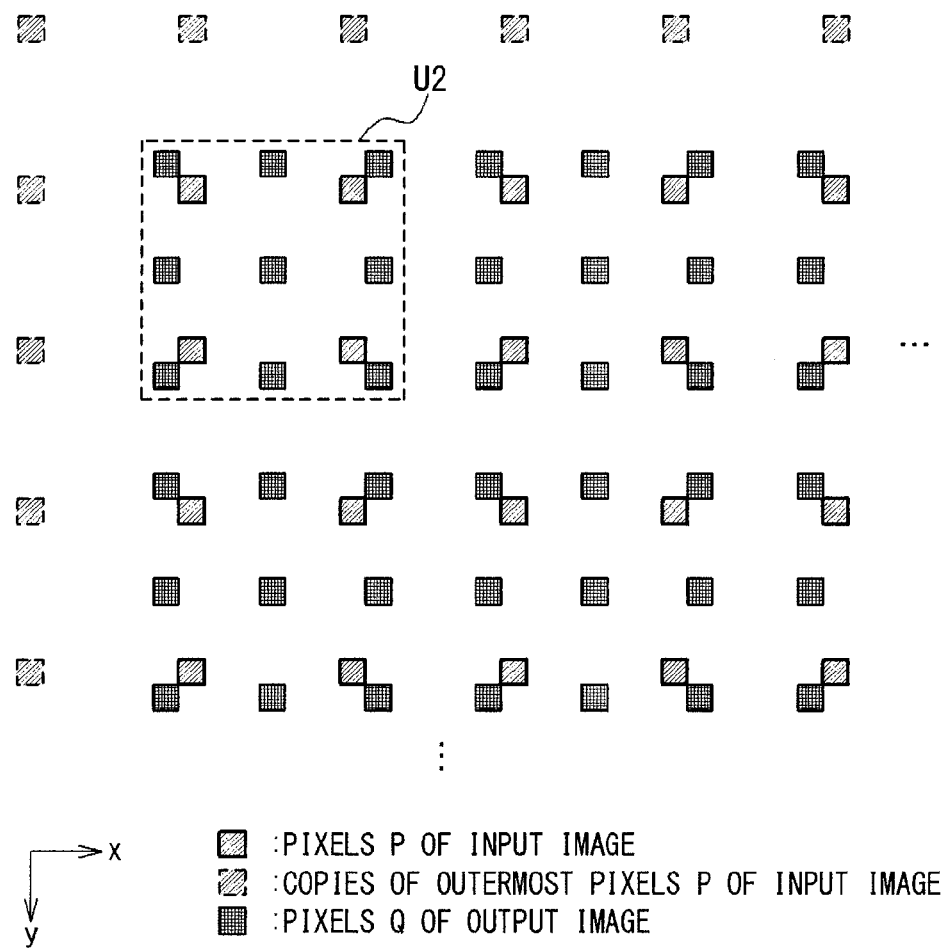
FIG. 9 conceptually illustrates image scaling with a scaling factor of 3/2.
Figure 10:
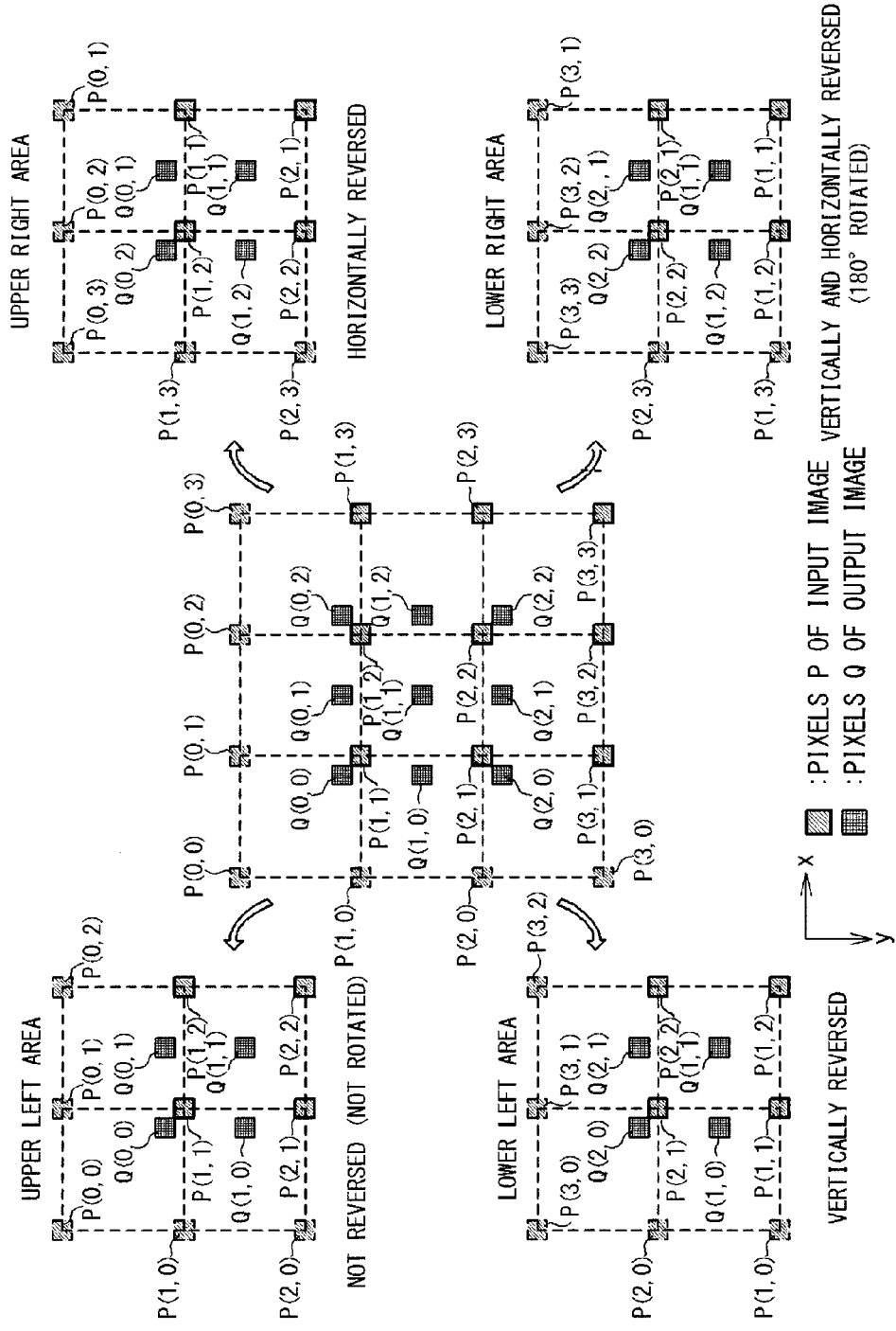
FIG. 10 illustrates the arrangement of 4×4 pixels P of an input image and 3×3 pixels Q of the corresponding output image, which are relevant to one unit process of the image scaling with the scaling factor of 3/2.

FIG. 9 conceptually illustrates image scaling with a scaling factor of 3/2, and FIG. 10 illustrates the arrangement of 4×4 pixels P of an input image and 3×3 pixels Q of the corresponding output image, which is associated with one unit process of the image scaling with the scaling factor of 3/2. In image scaling of a scaling factor of 3/2, four areas are defined in the region where 4×4 pixels P of an input image are arranged: upper left, upper right, lower left and lower right areas. It should be noted the four areas are defined so as to overlap one another. More specifically, the upper left area is defined as a rectangular area with respect to which pixels P(0, 0), P(0, 2), P(2, 0) and P(2, 2) are defined as vertices, and the upper right area is defined as a rectangular area with respect to which pixels P(0, 1), P(0, 3), P(2, 1) and P(2, 3) are defined as vertices. Correspondingly, the lower left area is defined as a rectangular area with respect to which pixels P(1, 0), P(1, 2), P(3, 0) and P(3, 2) are defined as vertices, and the lower right area is defined as a rectangular area with respect to which pixels P(1, 1), P(1, 3), P(3, 1) and P(3, 3) are defined as vertices. It should be noted that the upper right, lower left and lower right areas partially overlap the upper left area, when these area are defined as described above.

When the upper left, upper right, lower left and lower right areas are defined as described above, the pixel arrangements of the input and output images in the upper right, lower left and lower right areas are line-symmetric or point-symmetric with that of the input and output images in the upper left area. More specifically, the pixel arrangement of the input and output images in the upper right area is obtained by a horizontal reversal of the pixel arrangement of the input and output images in the upper left area. The pixel arrangement of the input and output images in the lower left area is obtained by a vertical reversal of the pixel arrangement of the input and output images in the upper left area. Furthermore, the pixel arrangement of the input and output images in the lower right area is obtained by vertical and horizontal reversals of the pixel arrangement of the input and output images in the upper left area. The number of sets of interpolation coefficients to be fed to a circuitry performing image scaling can be effectively reduced by making use of the symmetric properties described above.

In such image scaling, pixels Q of the output image located in a region where two areas overlap each other may be defined as belonging to any one of the two areas. For example, pixel Q(0, 1) is located in both of the upper left area and the upper right area. Pixel data of pixel Q(0, 1) may be calculated with pixel Q(0, 1) defined as belonging to the upper left area, without reversing the pixel arrangement of the input and output images. Alternatively, pixel data of pixel Q(0, 1) may be calculated with pixel Q(0, 1) defined as belonging to the upper right area, accompanied by a horizontal reversal of the pixel arrangement of the input and output images.

As is understood from the above-described discussion, pixel data of pixels Q of the output image can be calculated also for M being an odd number with the image processing circuit 10 configured as illustrated in FIG. 6 by modifying the rearrangement of pixel data in the pixel data rearrangement circuit 11 and the rearrangement of interpolation coefficients in the interpolation coefficient rearrangement circuit 13.

Although the image processing circuit 10 illustrated in FIG. 6 is configured to include one multiply-add circuit (scaling processing section) in which pixel data are calculated for one pixel of the output image at each step, the image processing circuit 10 may be configured to include multiple multiply-add circuits and to calculate pixel data of multiple pixels of the output image in parallel.

Figure 11:
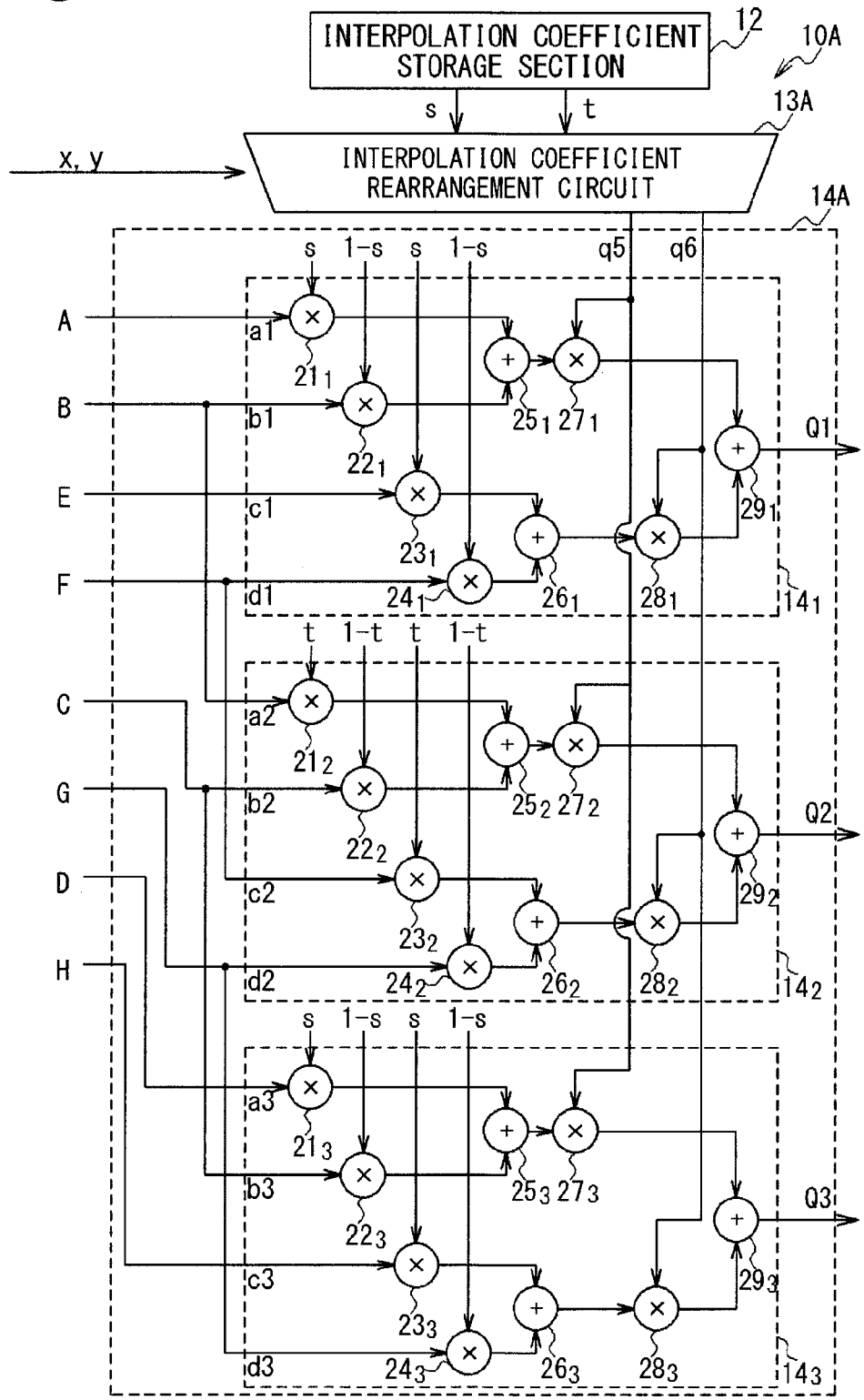
FIG. 11 is a circuit diagram illustrating an exemplary configuration of an image processing circuit for image scaling with a scaling factor of 3/2.
Figures 12, 13:
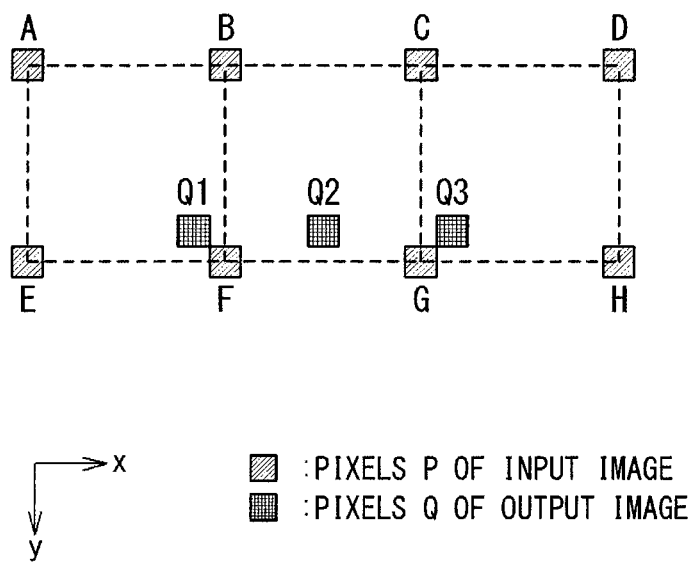
FIG. 12 conceptually illustrates the arrangement of pixels for which image scaling is performed by the image processing circuit illustrated in FIG. 11.
FIG. 13 is a truth table illustrating an exemplary operation of an interpolation coefficient rearrangement circuit in the present embodiment.

FIG. 11 is a circuit diagram illustrating an exemplary configuration of an image processing circuit 10A configured to calculate pixel data of multiple pixels of the output image in parallel. The image processing circuit 10A illustrated in FIG. 11 is configured to perform image scaling with a scaling factor of 3/2. It should be noted that the above-described discussion for M being an odd number applies to the image scaling with a scaling factor of 3/2. The image processing circuit 10A illustrated in FIG. 11 is configured to calculate pixel data of three target pixels Q1, Q2 and Q3 of the output image which are located in the same horizontal line (that is, having the same y-coordinate) from pixel data of eight pixels A, B, C, D, E, F, G and H arranged as illustrated in FIG. 12.

The image processing circuit 10A includes interpolation coefficient storage section 12, an interpolation coefficient rearrangement circuit 13A and a scaling processing section 14A. The interpolation coefficient storage section 12 stores therein interpolation coefficients s and t and feeds the stored interpolation coefficients s and t to the interpolation coefficient rearrangement circuit 13A. It should be noted that the interpolation coefficient storage section 12 only stores the interpolation coefficients s and t necessary for calculating pixel data of pixels positioned in the upper left area of the output image. The interpolation coefficient rearrangement circuit 13A calculates interpolation coefficients 1-s and 1-t from the interpolation coefficients s and t and feeds an interpolation coefficient selected from the interpolation coefficients s, 1-s, t and 1-t to each of the interpolation coefficient inputs q5 and q6 of the scaling processing section 14A. The scaling processing section 14A performs image scaling on the received pixel data of pixels A, B, C, D, E, F, G and H with the interpolation coefficients received on the interpolation coefficient inputs q5 and q6, to thereby calculate pixel data Q1, Q2 and Q3 of the target pixels of the output image.

It should be noted that the image processing circuit 10A illustrated in FIG. 11 is configured to handle all the pixels of the output image having the same y-coordinate in parallel in each unit process of the image scaling. Pixel data of 3×3 pixels of the output image are calculated in each unit process of image scaling with a scaling factor of 3/2 as described above, and this implies that the image processing circuit 10A illustrated in FIG. 11 handles pixel data of all the pixels of the output image having the same y-coordinate in parallel.

In the configuration in which pixel data of all the pixels of the output image having the same y-coordinate are handled in parallel, the rearrangement of pixel data of pixels of the input image data can be achieved by appropriately designing connections of interconnections used to feed pixel data to the image processing circuit 10A. Accordingly, the image processing circuit 10A illustrated in FIG. 11 does not include the pixel data rearrangement circuit 11, which performs rearrangement of pixel data of pixels of an input image, differently from the image processing circuit 10 illustrated in FIG. 6.

Additionally, the interpolation coefficients for the interpolation in the horizontal direction are fixed in the configuration in which all the pixels of the output image having the same y-coordinate are handled in parallel in each unit process. Accordingly, the interpolation coefficient rearrangement circuit 13 is configured to feed interpolation coefficients only for the interpolation in the vertical direction to the interpolation coefficient inputs q5 and q6 of the scaling processing section 14A.

The scaling processing section 14A include three multiply-add circuits $14_1$, $14_2$ and $14_3$ of the same configuration, each having the function of performing interpolation in image scaling. The multiply-add circuits $14_1$, $14_2$ and $14_3$ calculate pixel data Q1, Q2 and Q3 of the target pixels of the output image, respectively.

The multiply-add circuit $14_1$ includes multipliers $21_1$ to $24_1$, adders $25_1$, $26_1$, multipliers $28_1$ and an adder $29_1$.

The multiplier $21_1$ outputs the product of the pixel data received on the pixel data input a1 and the interpolation coefficient s, and the multiplier $22_1$ outputs the product of the pixel data received on the pixel data input b1 and the interpolation coefficient 1-s. Similarly, the multiplier $23_1$ outputs the product of the pixel data received on the pixel data input c1 and the interpolation coefficient s, and the multiplier $24_1$ outputs the product of the pixel data received on the pixel data input d1 and the interpolation coefficient 1-s. It should be noted that the interpolation coefficients s and 1-s fed to the multipliers $21_1$, $22_1$, $23_1$ and $24_1$ are used for the interpolation in the horizontal direction. The interpolation coefficients s and 1-s may be fed to the multipliers $21_1$, $22_1$, $23_1$ and $24_1$ from the interpolation coefficient rearrangement circuit 13A. Alternatively, a circuit which receives the interpolation coefficient s from the interpolation coefficient storage section 12 and feeds the interpolation coefficients s and 1-s to the multipliers $21_1$, $22_1$, $23_1$ and $24_1$ may be additionally prepared separately from the interpolation rearrangement circuit 13A.

The adder $25_1$ outputs the sum of the outputs of the multipliers $21_1$ and $22_1$, and the adder $26_1$ outputs the sum of the outputs of the multipliers $23_1$ and $24_1$. The multiplier $27_1$ outputs the product of the output of the adder $25_1$ and the interpolation coefficient received on the interpolation coefficient input q5, and the multiplier $28_1$ outputs the product of the output of the adder $26_1$ and the interpolation coefficient received on the interpolation coefficient input q6. The adder $29_1$ outputs the sum of the outputs of the multipliers $27_1$ and $28_1$. The output of the adder $29_1$ is used as pixel data of the target pixel Q1 of the output image.

Similarly, the multiply-add circuit $14_2$ includes multipliers $21_2$ to $24_2$, adders $25_2$, $26_2$, multipliers $27_2$, $28_2$ and an adder $29_2$.

The multiplier $21_2$ outputs the product of the pixel data received on the pixel data input a2 and the interpolation coefficient t, and the multiplier $22_2$ outputs the product of the pixel data received on the pixel data input b2 and the interpolation coefficient 1-t. Similarly, the multiplier $23_2$ outputs the product of the pixel data received on the pixel data input c2 and the interpolation coefficient t, and the multiplier $24_2$ outputs the product of the pixel data received on the pixel data input d2 and the interpolation coefficient 1-t. It should be noted that the interpolation coefficients t and 1-t fed to the multipliers $21_2$, $22_2$, $23_2$ and $24_2$ are used for the interpolation in the horizontal direction. The interpolation coefficients t and 1-t may be fed to the multipliers $21_2$, $22_2$, $23_2$ and $24_2$ from the interpolation coefficient rearrangement circuit 13A. Alternatively, a circuit which receives the interpolation coefficient t from the interpolation coefficient storage section 12 and feeds the interpolation coefficients t and 1-t to the multipliers $21_2$, $22_2$, $23_2$ and $24_2$ may be additionally prepared separately from the interpolation rearrangement circuit 13A.

The adder $25_2$ outputs the sum of the outputs of the multipliers $21_2$ and $22_2$, and the adder $26_2$ outputs the sum of the outputs of the multipliers $23_2$ and $24_2$. The multiplier $27_2$ outputs the product of the output of the adder $25_2$ and the interpolation coefficient received on the interpolation coefficient input q5, and the multiplier $28_2$ outputs the product of the output of the adder $26_2$ and the interpolation coefficient received on the interpolation coefficient input q6. The adder $29_2$ outputs the sum of the outputs of the multipliers $27_2$ and $28_2$. The output of the adder $29_2$ is used as pixel data of the target pixel Q2 of the output image.

Furthermore, the multiply-add circuit $14_3$ includes multipliers $21_3$ to $24_3$, adders $25_3$, $26_3$, multipliers $27_3$, $28_3$ and an adder $29_3$.

The multiplier $21_3$ outputs the product of the pixel data received on the pixel data input a3 and the interpolation coefficient s, and the multiplier $22_3$ outputs the product of the pixel data received on the pixel data input b3 and the interpolation coefficient 1-s. Similarly, the multiplier $23_3$ outputs the product of the pixel data received on the pixel data input c3 and the interpolation coefficient s, and the multiplier $24_3$ outputs the product of the pixel data received on the pixel data input d3 and the interpolation coefficient 1-s. It should be noted that the interpolation coefficients s and 1-s fed to the multipliers $21_3$, $22_3$, $23_3$ and $24_3$ are used for the interpolation in the horizontal direction. The interpolation coefficients s and 1-s may be fed to the multipliers $21_3$, $22_3$, $23_3$ and $24_3$ from the interpolation coefficient rearrangement circuit 13A. Alternatively, a circuit which receives the interpolation coefficient s from the interpolation coefficient storage section 12 and feeds the interpolation coefficients s and 1-s to the multipliers $21_3$, $22_3$, $23_3$ and $24_3$ may be additionally prepared separately from the interpolation rearrangement circuit 13A.

The adder $25_3$ outputs the sum of the outputs of the multipliers $21_3$ and $22_3$, and the adder $26_3$ outputs the sum of the outputs of the multipliers $23_3$ and $24_3$. The multiplier $27_3$ outputs the product of the output of the adder $25_3$ and the interpolation coefficient received on the interpolation coefficient input q5, and the multiplier $28_3$ outputs the product of the output of the adder $26_3$ and the interpolation coefficient received on the interpolation coefficient input q6. The adder $29_3$ outputs the sum of the outputs of the multipliers $27_3$ and $28_3$. The output of the adder $29_3$ is used as pixel data of the target pixel Q3 of the output image.

It should be noted that pixel data are fed to the multiply-add circuits $14_1$ and $14_2$ without reversing the pixel arrangement of the input image, while pixel data are fed to the multiply-add circuits $14_3$ with the pixel arrangement of the input image horizontally reversed. More specifically, in the case when pixels A to H of the input image are arranged as illustrated in FIG. 12, the pixel data inputs a1, b1, c1 and d1 of the multiply-add circuit $14_1$ are fed with pixel data A, B, E and F, respectively, and the pixel data inputs a2, b2, c2 and d2 of the multiply-add circuit $14_2$ are fed with pixel data B, C, F and G, respectively. The rearrangement of pixel data is not performed for the multiply-add circuits $14_1$ and $14_2$. For the multiply-add circuit $14_3$, on the other hand, the pixel data inputs a3, b3, c3 and d3 are fed with pixel data D, C, H and G, respectively. This means that the rearrangement of pixel data is achieved by routing of interconnections used to feed the pixel data to the multiply-add circuit $14_3$ in the configuration illustrated in FIG. 11.

FIG. 13 is a truth table illustrating an exemplary operation of the interpolation coefficient rearrangement circuit 13A in the present embodiment. As illustrated in FIG. 13, the interpolation coefficient rearrangement circuit 13A feeds the interpolation coefficients s and 1-s to the interpolation coefficient inputs q5 and q6, respectively, when y %3=0 for the y-coordinate of the target pixels Q1 to Q3. The interpolation coefficient rearrangement circuit 13A feeds the interpolation coefficients t and 1-t to the interpolation coefficient inputs q5 and q6, respectively, when y %3=1 and feeds the interpolation coefficients 1-s and s to the interpolation coefficient inputs q5 and q6, respectively, when y %3=2. In this embodiment, the vertical reversal of the pixel arrangement of the input and output images is achieved by swapping the interpolation coefficients fed to the interpolation coefficient inputs q5 and q6 between the cases when y %3=0 and when y %3=2.

FIGS. 14A to 16B are timing charts illustrating an exemplary operation of the image processing circuit 10A in the present embodiment.

Figure 14A:
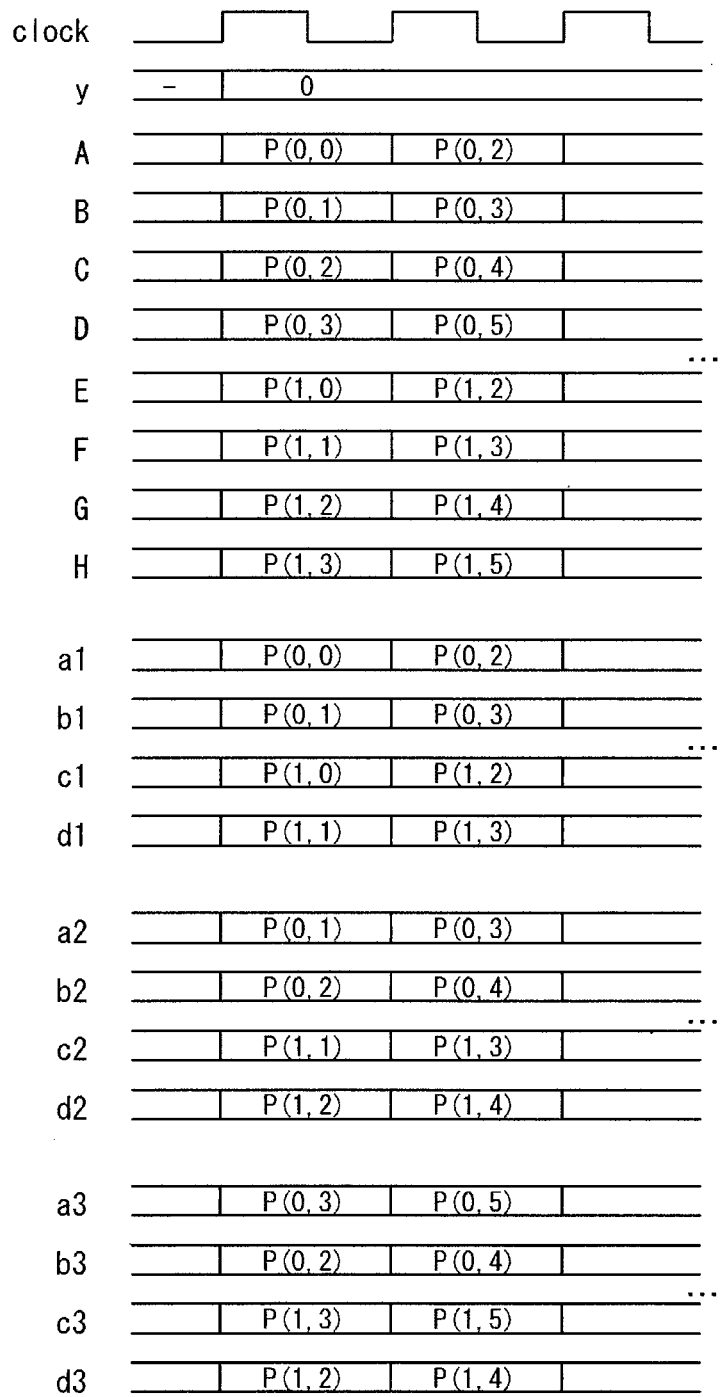

FIGS. 14A and 14B illustrate an exemplary operation of the image processing circuit 10A in calculating pixel data for y=0, that is, pixel data Q(0, 0), Q(0, 1), Q(0, 2), Q(0, 3) and Q(0, 4) . . . .

In detail, pixel data of pixels Q(0, 0), Q(0, 1) and Q(0, 2) of the output image are calculated in the first clock cycle after the y-coordinate is set to zero. As understood from FIG. 10, pixel data of pixels Q(0, 0), Q(0, 1) and Q(0, 2) of the output image are calculated from pixel data of pixels P(0, 0), P(0, 1), P(0, 2), P(0, 3), P(1, 0), P(1, 1), P(1,2) and P(1,3) of the input image. In other words, pixel data of pixels P(0, 0), P(0, 1), P(0, 2), P(0, 3), P(1, 0), P(1, 1), P(1,2) and P(1,3) are fed as pixel data A, B, C, D, E, F, G and H.

Pixels Q(0, 0) and Q(0, 1) of the output image are positioned in the upper left area as illustrated in FIG. 10 and therefore no reversal is performed for the arrangement of pixels P of the input image and pixels Q of the output image in the calculation of the pixel data of pixels Q(0, 0) and Q(0, 1). Accordingly, as illustrated in FIG. 14A, the pixel data inputs a1, b1, c1 and d1 are fed with pixel data A, B, E and F, that is, pixel data of pixels P(0, 0), P(0, 1), P(1, 0) and P(1, 1) of the input image and the pixel data inputs a2, b2, c2 and d2 are fed with pixel data B, C, F and G, that is, pixel data of pixels P(0, 1), P(0, 2), P(1, 1) and P(1, 2) of the input image, respectively.

In the meanwhile, pixel Q(0, 2) of the output image is positioned in the upper right area as is understood from FIG. 10 and therefore the arrangement of pixels P of the input image and pixels Q of the output image are horizontally reversed in the calculation of pixel data of pixel Q(0, 2). Accordingly, the pixel data input a3, b3, c3 and d3 are fed with pixel data D, C, H and G, that is, pixel data of pixels P(0, 3), P(0, 2), P(1, 3) and P(1, 2) of the input image.

It should be noted that pixel Q(0, 1) is positioned in the region in which the upper left and upper right areas overlap each other, and therefore the pixel data of pixel Q(0, 1) may be calculated with the arrangement of pixels P of the input image and pixels Q of the output image horizontally reversed, with a definition in which pixel Q(0, 1) is positioned in the upper right area. It should be however that the pixel data of pixel Q(0, 1) are calculated with a definition in which pixel Q(0, 1) is positioned in the upper left area, in the operation illustrated in FIGS. 14A and 14B.

The interpolation coefficient rearrangement circuit 13 feeds the interpolation coefficients s and 1-s to the interpolation coefficient inputs q5 and q6, respectively, for interpolation in the vertical direction. In this case, no vertical reversal is performed on the arrangement of pixels P of the input image and pixels Q of the output image.

The scaling processing section 14A calculates the pixel data of pixels Q(0, 0), Q(0, 1) and Q(0, 2) of the output image from the pixel data fed to the pixel data inputs a1 to d1, a2 to d2 and a3 to d3 and the interpolation coefficients fed to the interpolation coefficient inputs q5 and q6. As illustrated in FIG. 14B, pixel data of pixels Q(0, 0), Q(0, 1) and Q(0, 2) are calculated in accordance with the following expressions:

$$Q(0,0)=s \cdot (s \cdot P(0,0)+(1-s) \cdot P(0,1))+(1-s) \cdot (s \cdot P(1,0)+(1-s) \cdot P(1,1)),$$

$$Q(0,1)=s \cdot (t \cdot P(0,1)+(1-t) \cdot P(0,2))+(1-s) \cdot (t \cdot P(1,1)+(1-t) \cdot P(1,2)), \text{ and}$$

$$Q(0,2)=s \cdot (s \cdot P(0,3)+(1-s) \cdot P(0,2))+(1-s) \cdot (s \cdot P(1,3)+(1-s) \cdot P(1,2)).$$

Pixel data of other pixels Q of the output image with y=0 are calculated similarly to pixels Q(0, 0) to Q(0, 2). Pixel data of pixels Q(0, 3i) and Q(0, 3i+1) (where i is an integer equal to or more than one) are calculated without reversing the arrangement of pixels P of the input image and pixels Q of the output image, similarly to the pixel data of pixels Q(0, 0) and Q(0, 1). Pixel data of pixels Q(0, 3i+2) are calculated with the arrangement of pixels P of the input image and pixels Q of the output image horizontally reversed, similarly to the pixel data of pixels Q(0, 2).

Figure 15A:
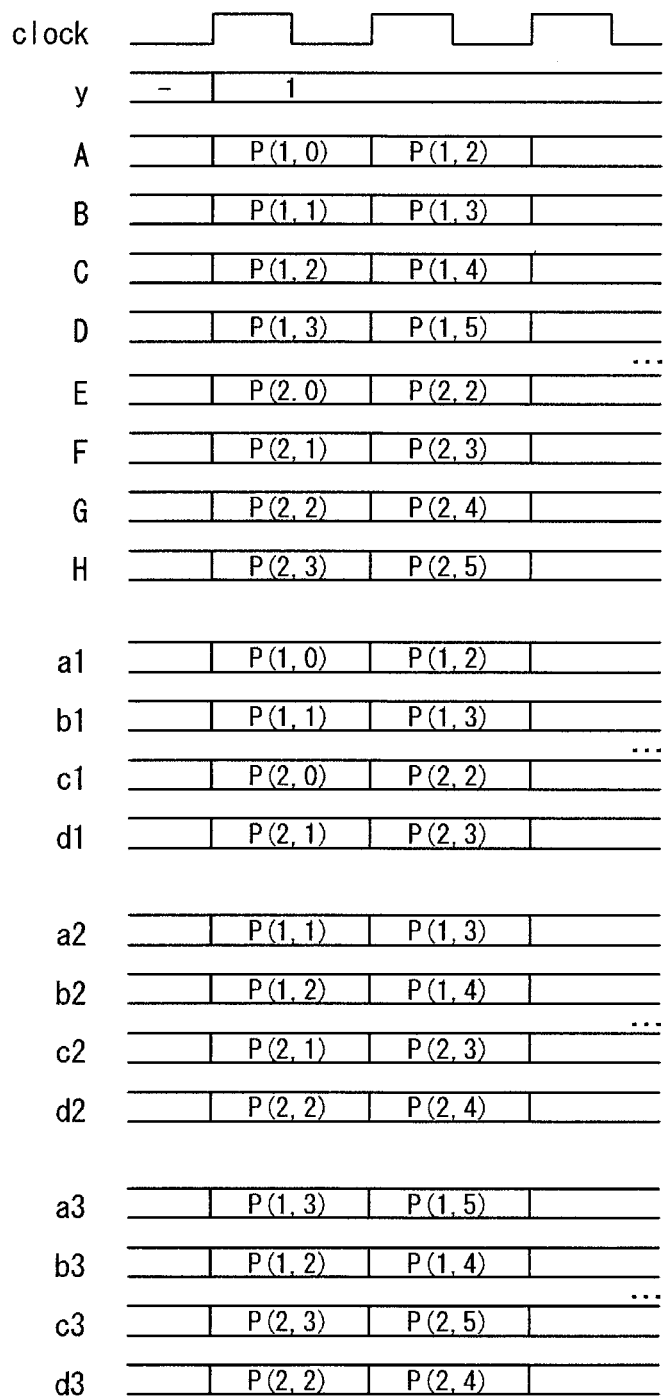

FIGS. 15A and 15B illustrate an exemplary operation of the image processing circuit 10A in calculating pixel data for y=1, that is, pixel data Q(1, 0), Q(1, 1), Q(1, 2), Q(1, 3) and Q(1, 4) . . . .

In detail, pixel data of pixels Q(1, 0), Q(1, 1) and Q(1, 2) of the output image are calculated in the first clock cycle after the y-coordinate is set to one. As understood from FIG. 10, pixel data of pixels Q(1, 0), Q(1, 1) and Q(1, 2) of the output image are calculated from pixel data of pixels P(1, 0), P(1, 1), P(1, 2), P(1, 3), P(2, 0), P(2, 1), P(2, 2) and P(2, 3) of the input image. In other words, pixel data of pixels P(1, 0), P(1, 1), P(1, 2), P(1, 3), P(2, 0), P(2, 1), P(2, 2) and P(2, 3) are fed as pixel data A, B, C, D, E, F, G and H.

Pixel Q(1, 0) of the output image is positioned in the region where the upper left and lower left areas overlap each other as illustrated in FIG. 10, and pixel Q(1, 1) is positioned in the region where the four areas overlap one another, while pixel Q(1, 2) is positioned in the region where the upper right and lower right areas overlap each other. For calculation simplicity, pixel data of pixels Q(1, 0), Q(l, 1) and Q(1, 2) are calculated with a definition in which pixels Q(1, 0) and Q(1, 1) of the output image are positioned in the upper left area and pixel Q(1, 2) is positioned in the upper right area, in the present embodiment. This allows calculating the pixel data of pixels Q(1, 0), Q(1, 1) and Q(1, 2) similarly to the case when y=0, only modifying the interpolation coefficients for interpolation in the vertical direction, which are fed to the interpolation coefficient inputs q5 and q6.

More specifically, pixels Q(1, 0) and Q(1, 1) are defined as being positioned in the upper left area and therefore no reversal is performed on the arrangement of pixels P of the input image and pixels Q of the output image in the calculation of pixel data of pixels Q(1, 0) and Q(1, 1). Accordingly, as illustrated in FIG. 15A, the pixel data inputs a1, b1, c1 and d1 are fed with pixel data A, B, E and F, that is, pixel data of pixels P(1, 0), P(1, 1), P(2, 0), P(2, 1) of the input image, and the pixel data inputs a2, b2, c2 and d2 are fed with pixel data B, C, F and G, that is, pixel data of pixels P(1, 1), P(1, 2), P(2, 1), P(2, 2) of the input image.

Pixel Q(1, 2) of the output image is, on the other hand, defined as being positioned in the upper right area and therefore the arrangement of pixels P of the input image and pixels Q of the output image is horizontally reversed in the calculation of pixel data of pixel Q(1, 2). Accordingly, the pixel data inputs a3, b3, c3 and d3 are fed with pixel data D, C, H and G, that is, pixel data of pixels P(1, 3), P(1, 2), P(2, 3) and P(2, 2) of the input image, respectively.

The interpolation coefficient rearrangement circuit 13 feeds the interpolation coefficients t and 1-t to the interpolation coefficient inputs q5 and q6, respectively, for interpolation in the vertical direction. In this case, no vertical reversal is performed on the arrangement of pixels P of the input image and pixels Q of the output image.

The scaling processing section 14A calculates the pixel data of pixels Q(1, 0), Q(1, 1) and Q(1, 2) of the output image from the pixel data fed to the pixel data inputs a1 to d1, a2 to d2 and a3 to d3 and the interpolation coefficients fed to the interpolation coefficient inputs q5 and q6. As illustrated in FIG. 15B, pixel data of pixels Q(1, 0), Q(1, 1) and Q(1, 2) are calculated in accordance with the following expressions:

$$Q(1,0)=t \cdot (s \cdot P(1,0)+(1-s) \cdot P(1,1))+(1-t) \cdot (s \cdot P(2,0)+(1-s) \cdot P(2,1)),$$

$$Q(1,1)=t \cdot (t \cdot P(1,1)+(1-t) \cdot P(1,2))+(1-t) \cdot (t \cdot P(2,1)+(1-t) \cdot P(2,2)), \text{ and}$$

$$Q(1,2)=t \cdot (s \cdot P(1,3)+(1-s) \cdot P(1,2))+(1-t) \cdot (s \cdot P(2,3)+(1-s) \cdot P(2,2)).$$

Pixel data of other pixels Q of the output image with y=1 are calculated similarly to pixels Q(1, 0) to Q(1, 2). Pixel data of pixels Q(1, 3i) and Q(1, 3i+1) (where i is an integer equal to or more than one) are calculated without reversing the arrangement of pixels P of the input image and pixels Q of the output image, similarly to the pixel data of pixels Q(1, 0) and Q(1, 1). Pixel data of pixels Q(1, 3i+2) are calculated with the arrangement of pixels P of the input image and pixels Q of the output image horizontally reversed, similarly to the pixel data of pixels Q(1, 2).

Figure 16A:
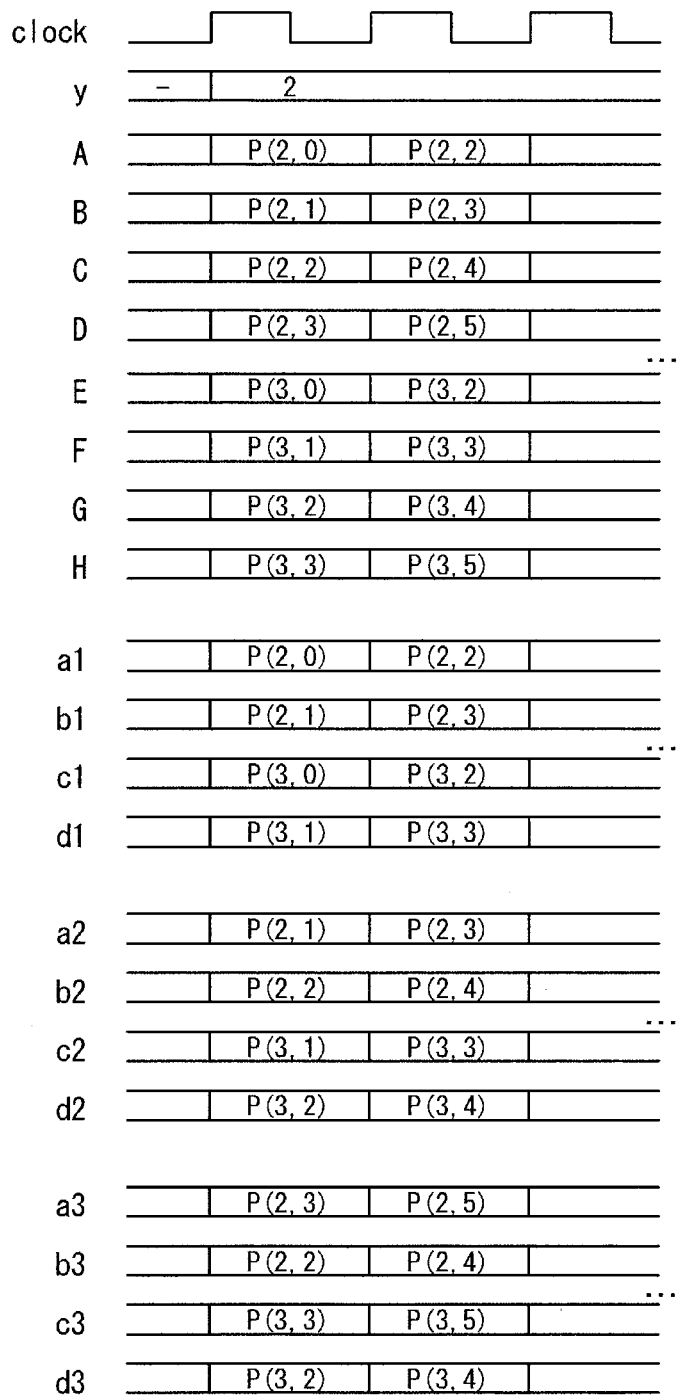

FIGS. 16A and 16B illustrate an exemplary operation of the image processing circuit 10A in calculating pixel data for y=2, that is, pixel data Q(2, 0), Q(2, 1), Q(2, 2), Q(2, 3) and Q(2, 4) . . . .

In detail, pixel data of pixels Q(2, 0), Q(2, 1) and Q(2, 2) of the output image are calculated in the first clock cycle after the y-coordinate is set to two. As understood from FIG. 10, pixel data of pixels Q(2, 0), Q(2, 1) and Q(2, 2) of the output image are calculated from pixel data of pixels P(2, 0), P(2, 1), P(2, 2), P(2, 3), P(3, 0), P(3, 1), P(3, 2) and P(3, 3) of the input image. In other words, pixel data of pixels P(2, 0), P(2, 1), P(2, 2), P(2, 3), P(3, 0), P(3, 1), P(3, 2) and P(3, 3) are fed as pixel data A, B, C, D, E, F, G and H.

Pixels Q(2, 0) and Q(2, 1) of the output image are positioned in the lower left area as illustrated in FIG. 10 and therefore no horizontal reversal is performed for the arrangement of pixels P of the input image and pixels Q of the output image in the calculation of the pixel data of pixels Q(2, 0) and Q(2, 1) (as described later, a vertical reversal is finally performed). Accordingly, as illustrated in FIG. 16A, the pixel data inputs a1, b1, c1 and d1 are fed with pixel data A, B, E and F, that is, pixel data of pixels P(2, 0), P(2, 1), P(3, 0) and P(3, 1) of the input image and the pixel data inputs a2, b2, c2 and d2 are fed with pixel data B, C, F and G, that is, pixel data of pixels P(2, 1), P(2, 2), P(3, 1) and P(3, 2) of the input image, respectively.

In the meanwhile, pixel Q(2, 2) of the output image is positioned in the lower right area as is understood from FIG. 10 and therefore the arrangement of pixels P of the input image and pixels Q of the output image are horizontally reversed in the calculation of pixel data of pixel Q(2, 2) (as described later, a vertical reversal is further performed). Accordingly, the pixel data input a3, b3, c3 and d3 are fed with pixel data D, C, H and G, that is, pixel data of pixels P(2, 3), P(2, 2), P(3, 3) and P(3, 2) of the input image.

It should be noted that pixel Q(2, 1) is positioned in the region in which the lower left and lower right areas overlap each other, and therefore the pixel data of pixel Q(2, 1) may be calculated with the arrangement of pixels P of the input image and pixels Q of the output image horizontally reversed, with a definition in which pixel Q(2, 1) is positioned in the lower right area. It should be however that, in the operation illustrated in FIGS. 16A and 16B, the pixel data of pixel Q(2, 1) are calculated with a definition in which pixel Q(2, 1) is positioned in the lower left area.

The interpolation coefficient rearrangement circuit 13 feeds the interpolation coefficients 1-s and s to the interpolation coefficient inputs q5 and q6, respectively, for interpolation in the vertical direction. This achieves a vertical reversal of the arrangement of pixels P of the input image and pixels Q of the output image. The vertical reversal of the arrangement of pixels P of the input image and pixels Q of the output image is used in the calculation of pixel data of pixels Q(2, 0), Q(2, 1) and Q(2, 2), since pixels Q(2, 0) and Q(2, 1) are positioned in the lower left area and pixel Q(2, 2) is positioned in the lower right area.

The scaling processing section 14A calculates the pixel data of pixels Q(2, 0), Q(2, 1) and Q(2, 2) of the output image from the pixel data fed to the pixel data inputs a1 to d1, a2 to d2 and a3 to d3 and the interpolation coefficients fed to the interpolation coefficient inputs q5 and q6. As illustrated in FIG. 16B, pixel data of pixels Q(2, 0), Q(2, 1) and Q(2, 2) are calculated in accordance with the following expressions:

$$Q(2,0)=(1-s)\cdot(s\cdot P(2,0)+(1-s)\cdot P(2,1))+s\cdot(s\cdot P(3,0)+(1-s)\cdot P(3,1)),$$

$$Q(2,1)=(1-s)\cdot(t\cdot P(2,1)+(1-t)\cdot P(2,2))+s\cdot(t\cdot P(3,1)+(1-t)\cdot P(3,2)), \text{ and}$$

$$Q(2,2)=(1-s)\cdot(s\cdot P(2,3)+(1-s)\cdot P(2,2))+s\cdot(s\cdot P(3,3)+(1-s)\cdot P(3,2)).$$

Pixel data of other pixels Q of the output image with y=2 are calculated similarly to pixels Q(2, 0) to Q(2, 2). Pixel data of pixels Q(2, 3i) and Q(2, 3i+1) (where i is an integer equal to or more than one) are calculated with the arrangement of pixels P of the input image and pixels Q of the output image vertically reversed, similarly to the pixel data of pixels Q(2, 0) and Q(2, 1). Pixel data of pixels Q(2, 3i+2) are calculated with the arrangement of pixels P of the input image and pixels Q of the output image vertically and horizontally reversed, similarly to the pixel data of pixels Q(2, 2).

The image processing circuits of the above-described embodiments are especially useful in a system for which hardware reduction is desired. Exemplary applications of the image processing circuits of the above-described embodiments include a display panel driver which drives a display panel (e.g. a liquid crystal display panel) in a panel display device. In the following, a description is given of an exemplary implementation of the above-described image processing circuits of the present embodiment.

Figure 17:
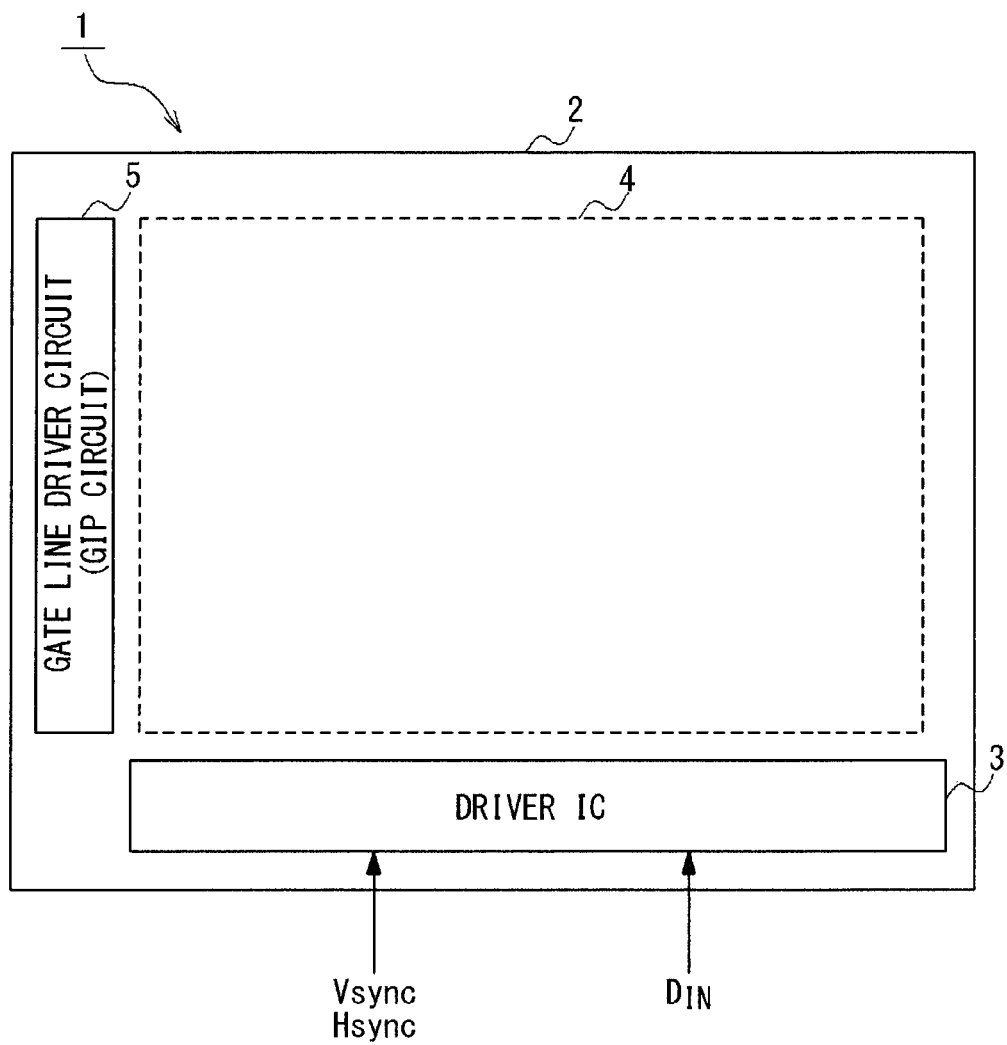
FIG. 17 is a block diagram illustrating an exemplary configuration of a display device in one embodiment of the present disclosure.

FIG. 17 is a block diagram illustrating an exemplary configuration of a display device in one embodiment of the present disclosure. The display device of the present embodiment, which is configured as a liquid crystal display device 1, includes a liquid crystal display panel 2, and a driver IC (integrated circuit) 3.

Figure 18:
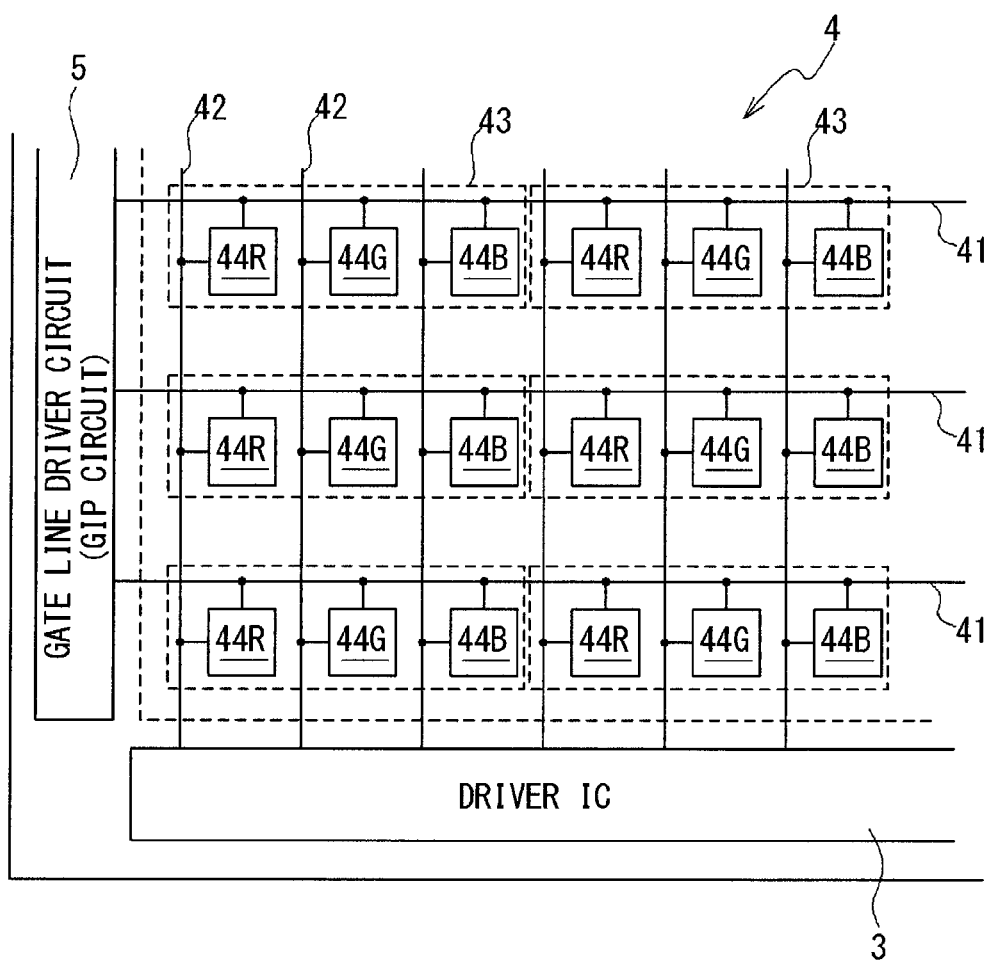
FIG. 18 is one example of the configuration of a display region of a liquid crystal display panel.

The liquid crystal display panel 2 includes a display region 4 and a gate line driver circuit 5 (also referred to as GIP (gate-in-panel) circuit). As illustrated in FIG. 18, a plurality of gate lines 41 (also referred to as scan lines or address lines), a plurality of source lines 42 (also referred to as signal lines or data lines) and a plurality of pixels 43 are arranged in the display region 4. In the present embodiment, each pixel 43 include an R subpixel 44R displaying the red color (R), a G subpixel 44G displaying the green color (G) and a B subpixel 44B displaying the blue color (B). The R, G and B subpixels 44R, 44G and 44B are connected to the same gate line 41 and also connected to different source lines 42. It would be apparent to a person skilled in the art that the configuration of each pixel 43 (such as the arrangement of the R, G and B subpixels 44R, 44G and 44B) may be variously modified. The gate line driver circuit 5 sequentially drives the gate lines 41. In driving the pixels 43 of the liquid crystal display panel 2, the gate lines 41 are sequentially selected and desired analog drive voltages are written into the subpixels (the R, G and B subpixels 44R, 44G and 44B) connected to the selected gate line 41 via the source lines 42. This allows setting the respective subpixels to desired grayscale levels, and thereby a desired image is displayed in the display region 4 of the liquid crystal display panel 2.

Referring back to FIG. 17, the driver IC 3 drives the source lines 42 of the display region 4 in response to pixel data $D_{IN}$ of the respective pixels of the input image, which are externally fed to the driver IC 3 (typically, from a processing unit). When each pixel 43 of the liquid crystal display panel 2 is configured as illustrated in FIG. 18, the pixel data $D_{IN}$ of each pixel 43 include data indicating the grayscale levels of the R, G and B subpixels 44R, 44G and 44B. The driver IC 3 drives the source lines 42 in synchronization with timing control signals externally fed to the driver IC 3, more specifically, a vertical sync signal Vsync and a horizontal sync signal Hsync. The driver IC 3 is mounted on the liquid display panel 2 with a surface mounting technology, such as a COG (chip-on-glass) technology.

Figure 19:
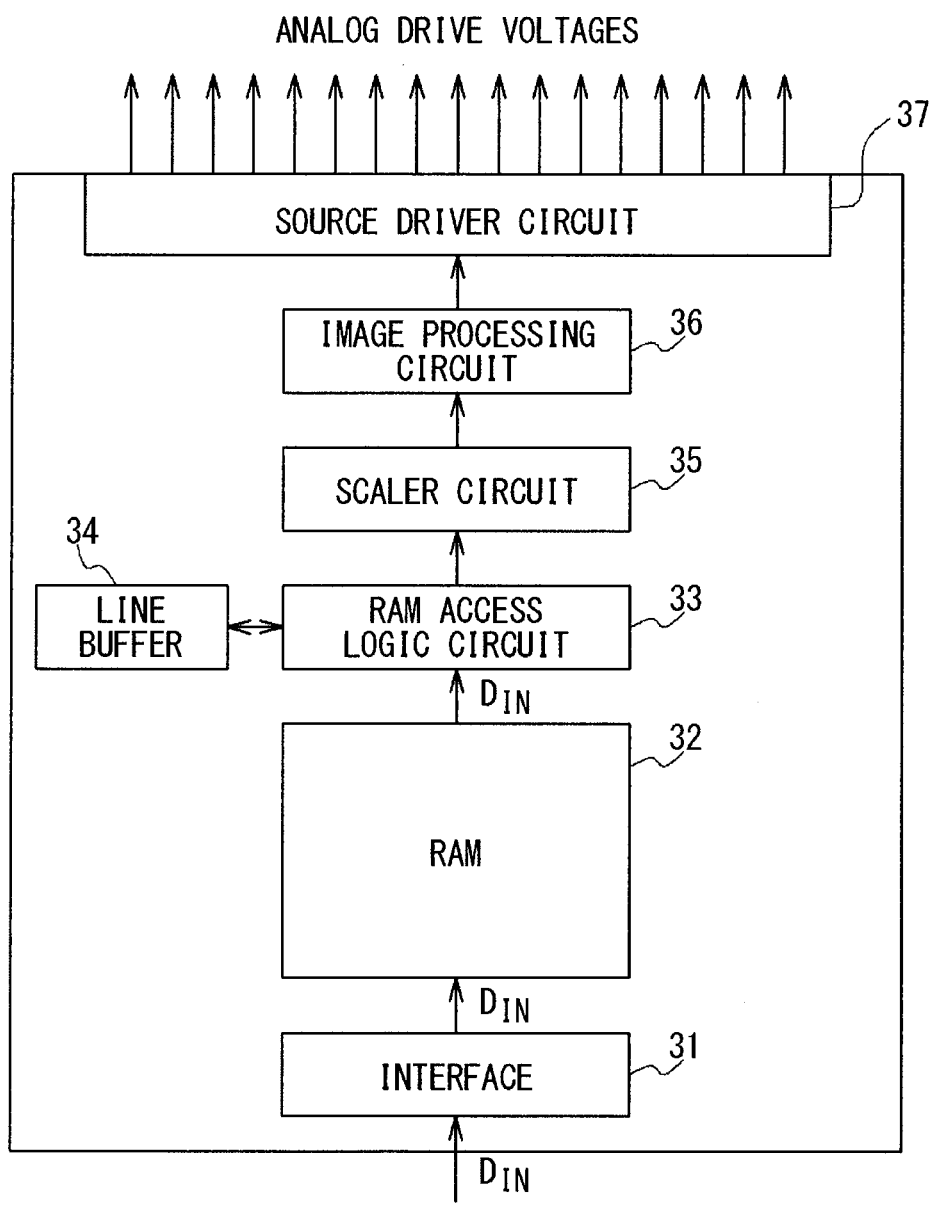
FIG. 19 is a block diagram illustrating an example of the configuration of a driver IC.

FIG. 19 illustrates one example of the configuration of the driver IC 3 in the present embodiment. In the present embodiment, the driver IC 3 includes an interface 31, a RAM 32, a RAM access logic circuit 33, a line buffer 34, a scaler circuit 35, an image processing circuit 36 and a source driver circuit 37.

The interface 31 forwards the pixel data $D_{IN}$ of the input image to the RAM 32 and controls the operation timing of the driver IC 3 in synchronization with the vertical sync signal Vsync and the horizontal sync signal Hsync.

The RAM 32 stores therein the pixel data $D_{IN}$ of the input image. In the present embodiment, the RAM 32 has a capacity sufficient to store pixel data of one frame image (an image displayed in the display region 4 in each frame period (each vertical sync period)).

The RAM access logic circuit 33 reads out the pixel data $D_{IN}$ of the input image from the RAM 32 and forwards the pixel data $D_{IN}$ of the input image to the scaler circuit 35.

The line buffer 34 is used as a work area for forwarding from the RAM access logic circuit 33 to the scaler circuit 35 the pixel data $D_{IN}$ of the input image received from the RAM 32 in a proper order.

The scaler circuit 35 performs image scaling on the pixel data received from the RAM access logic circuit 33 to generate pixel data of the respective pixels of the output image. In one embodiment, the above-described image processing circuit 10 may be incorporated in the scaler circuit 35.

The image processing circuit 36 performs predetermined image processing on the pixel data of the respective pixels of the output image, which is obtained through the image scaling by the scaler circuit 35, to generate pixel data of the respective pixels of an image finally displayed in the display region 4 of the liquid crystal display panel 2. The image processing performed in the image processing circuit 36 may include, for example, edge enhancement. In general, image scaling through a bilinear method often causes image blur and therefore it is advantageous to perform edge enhancement in the image processing circuit 36 to obtain a sharp image.

The source driver circuit 37 drives the respective pixels 43 in the display region 4 in response to the output pixel data received from the image processing circuit 36.

Although specific embodiments of the present disclosure have been described above, the present disclosure must not be construed as being limited to the above-described embodiments; it would be apparent to a person skilled in the art that the present disclosure may be implemented with various modifications. It should be especially noted that, although the above-described embodiments recite that the present disclosure is applied to a driver IC driving a liquid crystal display panel in a liquid crystal display device, the present disclosure is applicable to a display panel driver driving a different display panel (such as an OLED (organic light emitting diode) display panel and a plasma display panel) in a display device.

What is claimed is:

1. An image processing circuit for generating an output image by performing image scaling on an input image, the circuit comprising:
    a scaling processing section having a plurality of interpolation coefficient inputs;
    an interpolation coefficient rearrangement section; and
    an interpolation coefficient feeding section feeding a plurality of first interpolation coefficients to the interpolation coefficient rearrangement section,
    wherein the interpolation coefficient rearrangement section is configured to feed interpolation coefficients selected from the plurality of first interpolation coefficients and a plurality of second interpolation coefficients obtained by subtracting the first interpolation coefficients from a predetermined value, respectively, to the respective interpolation coefficient inputs of the scaling processing section in response to coordinates of a target pixel of the output image, and
    wherein the scaling processing section is configured to generate pixel data of the target pixel of the output image by performing interpolation on the pixel data of pixels of the input image, using the interpolation coefficients fed to the interpolation coefficient inputs from the interpolation coefficient rearrangement section.

2. The image processing circuit according to claim 1, further comprising a pixel data rearrangement section, wherein the scaling processing section includes first to fourth pixel data inputs,
    wherein the pixel data rearrangement section receives pixel data of four pixels of the input image used for the generation of the target pixel of the output image and feeds the received pixel data of the four pixels to the first to fourth pixel data inputs, rearranging the pixel data of the four pixels in response to the coordinates of the target pixel, and
    wherein the scaling processing section generates the pixel data of the target pixel of the output image by performing the interpolation on the pixel data of the four pixels of the input image, received on the first to fourth pixel data inputs.

3. The image processing circuit according to claim 1, wherein the image processing circuit performs image scaling with a scaling factor of M/N (where M and N are positive integers selected so that M/N is an irreducible fraction),
    wherein first to fourth areas are defined in a region in which (N+2)×(N+2) pixels of the input image and M×M pixels of the output image relevant to each unit processing of the image scaling are arranged so that the following conditions (a) to (d) are satisfied:
(a) the second area is shifted from the first area in a first direction, the third area is shifted from the first area in a second direction perpendicular to the first direction and the fourth area is shifted from the third area in the first direction,
(b) an arrangement of pixels of the input and output images in the second area is line-symmetric with that of pixels of the input and output images in the first area,
(c) an arrangement of pixels of the input and output images in the third area is line-symmetric with that of the pixels of the input and output images in the first area, and
(d) an arrangement of pixels of the input and output images in the fourth area is point-symmetric with that of the pixels of the input and output images in the first area, and
    wherein the interpolation coefficient feeding section is configured to feed interpolation coefficients associated with pixels of the output image positioned in a first area to the interpolation coefficient rearrangement section as the first interpolation coefficients.

4. The image processing circuit according to claim 3, wherein M is an even number and
    wherein the first to fourth areas are defined so that the first to fourth areas do not overlap one another.

5. The image processing circuit according to claim 4, wherein M is an odd number and
    wherein the first to fourth areas are defined so that the first to fourth areas partially overlap one another.

6. The image processing circuit according to claim 2, wherein the image processing circuit performs image scaling with a scaling factor of M/N (where M and N are positive integers selected so that M/N is an irreducible fraction),
    wherein first to fourth areas are defined in a region in which (N+2)×(N+2) pixels of the input image and M×M pixels of the output image relevant to each unit processing of the image scaling are arranged so that the following conditions (a) to (d) are satisfied:

(a) the second area is shifted from the first area in a first direction, the third area is shifted from the first area in a second direction perpendicular to the first direction and the fourth area is shifted from the third area in the first direction, (b) an arrangement of pixels of the input and output images in the second area is line-symmetric with that of pixels of the input and output images in the first area, (c) an arrangement of pixels of the input and output images in the third area is line-symmetric with that of the pixels of the input and output images in the first area, and (d) an arrangement of pixels of the input and output images in the fourth area is point-symmetric with that of the pixels of the input and output images in the first area, and wherein the interpolation coefficient feeding section is configured to feed interpolation coefficients associated with pixels of the output image positioned in a first area to the interpolation coefficient rearrangement section as the first interpolation coefficients.

7. The image processing circuit according to claim 1, wherein the scaling processing section includes a plurality of multiply-add circuits each having first to fourth pixel data inputs, and wherein each of the multiply-add circuits is configured to generate pixel data of a pixel of the output image by performing interpolation on pixel data of pixels of the input image fed to the first to fourth pixel data inputs, using the interpolation coefficients fed to the interpolation coefficient inputs from the interpolation coefficient rearrangement section.

8. The image processing circuit according to claim 7, wherein the image processing circuit is configured to perform image scaling with a scaling factor of M/N (where M and N are positive integers selected so that M/N is an irreducible fraction), and wherein the number of the multiply-add circuits is M.

9. A display panel driver for driving a display panel, comprising:

a scaler circuit performing image scaling on pixel data of pixels of an input image to generate pixel data of pixels of an output image; and a drive section driving the display panel in response to the pixel data of the pixels of the output image received from the scaler circuit, wherein the scaler circuit includes:
a scaling processing section having a plurality of interpolation coefficient inputs;
an interpolation coefficient rearrangement section; and
an interpolation coefficient feeding section feeding a plurality of first interpolation coefficients to the interpolation coefficient rearrangement section, wherein the interpolation coefficient rearrangement section is configured to feed interpolation coefficients selected from the plurality of first interpolation coefficients and a plurality of second interpolation coefficients obtained by subtracting the first interpolation coefficients from a predetermined value, respectively, to the respective interpolation coefficient inputs of the scaling processing section in response to coordinates of a target pixel of the output image, and wherein the scaling processing section is configured to generate pixel data of the target pixel of the output image by performing interpolation on the pixel data of pixels of the input image, using the interpolation coefficients fed to the interpolation coefficient inputs from the interpolation coefficient rearrangement section.

10. The display panel driver according to claim 9, wherein the scaler circuit further includes a pixel data rearrangement section, wherein the scaling processing section includes first to fourth pixel data inputs, wherein the pixel data rearrangement section receives pixel data of four pixels of the input image used for the generation of the target pixel of the output image and feeds the received pixel data of the four pixels to the first to fourth pixel data inputs, rearranging the pixel data of the four pixels in response to the coordinates of the target pixel, and wherein the scaling processing section generates the pixel data of the target pixel of the output image by performing the interpolation on the pixel data of the four pixels of the input image, received on the first to fourth pixel data inputs.

11. The display panel driver according to claim 9, wherein the scaler circuit performs image scaling with a scaling factor of M/N (where M and N are positive integers selected so that M/N is an irreducible fraction), wherein first to fourth areas are defined in a region in which (N+2)×(N+2) pixels of the input image and M×M pixels of the output image relevant to each unit processing of the image scaling are arranged so that the following conditions (a) to (d) are satisfied:

(a) the second area is shifted from the first area in a first direction, the third area is shifted from the first area in a second direction perpendicular to the first direction and the fourth area is shifted from the third area in the first direction, (b) an arrangement of pixels of the input and output images in the second area is line-symmetric with that of pixels of the input and output images in the first area, (c) an arrangement of pixels of the input and output images in the third area is line-symmetric with that of the pixels of the input and output images in the first area, and (d) an arrangement of pixels of the input and output images in the fourth area is point-symmetric with that of the pixels of the input and output images in the first area, and wherein the interpolation coefficient feeding section is configured to feed interpolation coefficients associated with pixels of the output image positioned in a first area to the interpolation coefficient rearrangement section as the first interpolation coefficients.

12. The display panel driver according to claim 10, wherein the scaler circuit performs image scaling with a scaling factor of M/N (where M and N are positive integers selected so that M/N is an irreducible fraction), wherein first to fourth areas are defined in a region in which (N+2)×(N+2) pixels of the input image and M×M pixels of the output image relevant to each unit processing of the image scaling are arranged so that the following conditions (a) to (d) are satisfied:

(a) the second area is shifted from the first area in a first direction, the third area is shifted from the first area in a second direction perpendicular to the first direction and the fourth area is shifted from the third area in the first direction, (b) an arrangement of pixels of the input and output images in the second area is line-symmetric with that of pixels of the input and output images in the first area, (c) an arrangement of pixels of the input and output images in the third area is line-symmetric with that of the pixels of the input and output images in the first area, and (d) an arrangement of pixels of the input and output images in the fourth area is point-symmetric with that of the pixels of the input and output images in the first area, and wherein the interpolation coefficient feeding section is configured to feed interpolation coefficients associated with pixels of the output image positioned in a first area to the interpolation coefficient rearrangement section as the first interpolation coefficients.

13. The display panel driver according to claim 9, wherein the scaling processing section includes a plurality of multiply-add circuits each having first to fourth pixel data inputs, and wherein each of the multiply-add circuits is configured to generate pixel data of a pixel of the output image by performing interpolation on pixel data of pixels of the input image fed to the first to fourth pixel data inputs, using the interpolation coefficients fed to the interpolation coefficient inputs from the interpolation coefficient rearrangement section.

14. A display device, comprising:

a display panel; and a display panel driver including:

a scaler circuit performing image scaling on pixel data of pixels of an input image to generate pixel data of pixels of an output image; and a drive section driving the display panel in response to the pixel data of the pixels of the output image received from the scaler circuit, wherein the scaler circuit includes:

a scaling processing section having a plurality of interpolation coefficient inputs;

an interpolation coefficient rearrangement section; and an interpolation coefficient feeding section feeding a plurality of first interpolation coefficients to the interpolation coefficient rearrangement section, wherein the interpolation coefficient rearrangement section is configured to feed interpolation coefficients selected from the plurality of first interpolation coefficients and a plurality of second interpolation coefficients obtained by subtracting the first interpolation coefficients from a predetermined value, respectively, to the respective interpolation coefficient inputs of the scaling processing section in response to coordinates of a target pixel of the output image, and wherein the scaling processing section is configured to generate pixel data of the target pixel of the output image by performing interpolation on the pixel data of pixels of the input image, using the interpolation coefficients fed to the interpolation coefficient inputs from the interpolation coefficient rearrangement section.

15. The display device according to claim 14, wherein the scaler circuit further includes a pixel data rearrangement section, wherein the scaling processing section includes first to fourth pixel data inputs, wherein the pixel data rearrangement section receives pixel data of four pixels of the input image used for the generation of the target pixel of the output image and feeds the received pixel data of the four pixels to the first to fourth pixel data inputs, rearranging the pixel data of the four pixels in response to the coordinates of the target pixel, and wherein the scaling processing section generates the pixel data of the target pixel of the output image by performing the interpolation on the pixel data of the four pixels of the input image, received on the first to fourth pixel data inputs.

16. The display device according to claim 14, wherein the scaler circuit performs image scaling with a scaling factor of M/N (where M and N are positive integers selected so that M/N is an irreducible fraction), wherein first to fourth areas are defined in a region in which (N+2)×(N+2) pixels of the input image and M×M pixels of the output image relevant to each unit processing of the image scaling are arranged so that the following conditions (a) to (d) are satisfied:

(a) the second area is shifted from the first area in a first direction, the third area is shifted from the first area in a second direction perpendicular to the first direction and the fourth area is shifted from the third area in the first direction, (b) an arrangement of pixels of the input and output images in the second area is line-symmetric with that of pixels of the input and output images in the first area, (c) an arrangement of pixels of the input and output images in the third area is line-symmetric with that of the pixels of the input and output images in the first area, and (d) an arrangement of pixels of the input and output images in the fourth area is point-symmetric with that of the pixels of the input and output images in the first area, and wherein the interpolation coefficient feeding section is configured to feed interpolation coefficients associated with pixels of the output image positioned in a first area to the interpolation coefficient rearrangement section as the first interpolation coefficients.

17. The display device according to claim 15, wherein the scaler circuit performs image scaling with a scaling factor of M/N (where M and N are positive integers selected so that M/N is an irreducible fraction), wherein first to fourth areas are defined in a region in which (N+2)×(N+2) pixels of the input image and M×M pixels of the output image relevant to each unit processing of the image scaling are arranged so that the following conditions (a) to (d) are satisfied:

(a) the second area is shifted from the first area in a first direction, the third area is shifted from the first area in a second direction perpendicular to the first direction and the fourth area is shifted from the third area in the first direction, (b) an arrangement of pixels of the input and output images in the second area is line-symmetric with that of pixels of the input and output images in the first area, (c) an arrangement of pixels of the input and output images in the third area is line-symmetric with that of the pixels of the input and output images in the first area, and (d) an arrangement of pixels of the input and output images in the fourth area is point-symmetric with that of the pixels of the input and output images in the first area, and wherein the interpolation coefficient feeding section is configured to feed interpolation coefficients associated with pixels of the output image positioned in a first area to the interpolation coefficient rearrangement section as the first interpolation coefficients.

18. The display device according to claim 14, wherein the scaling processing section includes a plurality of multiply-add circuits each having first to fourth pixel data inputs, and wherein each of the multiply-add circuits is configured to generate pixel data of a pixel of the output image by performing interpolation on pixel data of pixels of the input image fed to the first to fourth pixel data inputs, using the interpolation coefficients fed to the interpolation coefficient inputs from the interpolation coefficient rearrangement section.

19. An image processing method for generating an output image by performing image scaling on an input image with a scaling processing section having a plurality of interpolation coefficient inputs, the method comprising:

feeding a plurality of first interpolation coefficients to an interpolation coefficient rearrangement section;

by the interpolation coefficient rearrangement section, feeding interpolation coefficients selected from the plurality of first interpolation coefficients and a plurality of second interpolation coefficients obtained by subtracting the first interpolation coefficients from a predetermined value, respectively, to the respective interpolation coefficient inputs of the scaling processing section in response to coordinates of a target pixel of the output image; and by the scaling processing section, generating pixel data of the target pixel of the output image by performing interpolation on the pixel data of pixels of the input image, using the interpolation coefficients fed to the interpolation coefficient inputs from the interpolation coefficient rearrangement section.

20. The image processing method according to claim 19, further comprising:

receiving pixel data of four pixels of the input image used for the generation of the target pixel of the output image; and feeding the received pixel data of the four pixels to the first to fourth pixel data inputs of the scaling processing section, with the pixel data of the four pixels rearranged in response to the coordinates of the target pixel, wherein the pixel data of the target pixel of the output image are generated by performing the interpolation on the pixel data of the four pixels of the input image, received on the first to fourth pixel data inputs.

* * * * *